US011124674B2

(12) United States Patent
Kralev et al.

(10) Patent No.: US 11,124,674 B2
(45) Date of Patent: Sep. 21, 2021

(54) MATRICES AND SEALANTS WHICH ARE BASED ON SULFUR-CONTAINING POLYMERS AND WHICH COMPRISE A PHOTOINITIATOR, CURING AND COATING METHODS, AND USE OF SAID MATRICES AND SEALANTS

(71) Applicant: CHEMETALL GMBH, Frankfurt am Main (DE)

(72) Inventors: Miroslav Kralev, Frankfurt am Main (DE); Björn Sievers, Frankfurt am Main (DE); Peter Bons, Reichelsheim (DE); Francisco Diez, Morfelden-Walldorf (DE)

(73) Assignee: Chemetall GmbH, Frankfurt (DE)

( * ) Notice: Subject to any disclaimer, the term of this patent is extended or adjusted under 35 U.S.C. 154(b) by 40 days.

(21) Appl. No.: 16/445,942

(22) Filed: Jun. 19, 2019

(65) Prior Publication Data
US 2019/0300747 A1    Oct. 3, 2019

Related U.S. Application Data

(62) Division of application No. 14/391,590, filed as application No. PCT/EP2013/057353 on Apr. 9, 2013, now Pat. No. 10,370,562.

(30) Foreign Application Priority Data

Apr. 12, 2012   (DE) .......................... 102012205951.2

(51) Int. Cl.
| | | |
|---|---|---|
| C09D 181/04 | (2006.01) | |
| B05D 7/24 | (2006.01) | |
| C08L 81/00 | (2006.01) | |
| B05D 3/06 | (2006.01) | |
| C09D 181/00 | (2006.01) | |
| C08L 81/04 | (2006.01) | |

(52) U.S. Cl.
CPC ............. *C09D 181/04* (2013.01); *B05D 3/06* (2013.01); *B05D 7/24* (2013.01); *C08L 81/00* (2013.01); *C08L 81/04* (2013.01); *C09D 181/00* (2013.01)

(58) Field of Classification Search
CPC ...... C09D 181/04; C09D 181/00; B05D 7/24; B05D 3/06; C08L 81/00; C08L 81/04
See application file for complete search history.

(56) References Cited

U.S. PATENT DOCUMENTS

| | | | |
|---|---|---|---|
| 3,645,816 A | 2/1972 | Billias et al. | |
| 6,525,168 B2* | 2/2003 | Zook ...................... | C08G 75/04 528/373 |
| 8,077,373 B2 | 12/2011 | Kumar et al. | |
| 8,089,678 B2 | 1/2012 | Kumar et al. | |
| 2004/0157002 A1 | 8/2004 | Bons et al. | |
| 2004/0181007 A1 | 9/2004 | Acevedo et al. | |
| 2005/0061280 A1 | 3/2005 | Jialanella et al. | |
| 2007/0291345 A1 | 12/2007 | Kumar et al. | |
| 2009/0135462 A1 | 5/2009 | Kumar et al. | |
| 2010/0227942 A1 | 9/2010 | Spyrou et al. | |
| 2011/0319559 A1 | 12/2011 | Kania et al. | |
| 2012/0301696 A1* | 11/2012 | Watanabe ............ | C08K 5/3477 428/220 |
| 2013/0295290 A1 | 11/2013 | Anderson et al. | |

FOREIGN PATENT DOCUMENTS

| | | |
|---|---|---|
| DE | 10108136 A1 | 8/2002 |
| WO | 2004067635 A1 | 8/2004 |
| WO | 2004099317 A1 | 11/2004 |
| WO | 2006029144 A1 | 3/2006 |
| WO | 2006029145 A1 | 3/2006 |
| WO | 2008111995 A1 | 9/2008 |
| WO | 2009010423 A1 | 1/2009 |

OTHER PUBLICATIONS

Office Action for CN Patent Application No. 201380030637, dated Jun. 19, 2017, 7 pages of Office Action and 3 pages of English Translation.

* cited by examiner

*Primary Examiner* — Jessica M Roswell
(74) *Attorney, Agent, or Firm* — Armstrong Teasdale LLP

(57) ABSTRACT

A method for curing a mixture of a matrix and a curing agent based on sulfur-containing polymers on command and so rapidly that a tack-free surface results. A method for coating a substrate with the composition and of curing a sealant is also provided. The matrix and curing agent containing sulfur-containing polymers. The mixture is an uncured mixture with an isocyanate content, and the matrix is uncured and contains a mercaptan-terminated base polymer based on at least one polyether, polythioether, polysulfide or copolymers thereof. The uncured matrix, the curing agent, or both contain at least one photoinitiator based on sterically-inhibited tertiary amines. The mixture cures in the temperature range of −10 to +70° C. after the high-energy actinic radiation is applied. Corresponding matrices A, mixtures B, curing agents, sealant systems, and substrates, e.g., aircraft are contemplated.

19 Claims, No Drawings

MATRICES AND SEALANTS WHICH ARE BASED ON SULFUR-CONTAINING POLYMERS AND WHICH COMPRISE A PHOTOINITIATOR, CURING AND COATING METHODS, AND USE OF SAID MATRICES AND SEALANTS

CROSS-REFERENCE TO RELATED APPLICATIONS

This application is a divisional application of U.S. patent application Ser. No. 14/391,590, filed on Oct. 9, 2014, which is a national stage entry of International Application No. PCT/EP2013/057353, filed on Apr. 9, 2013, which claims the benefit of priority to German Patent Application No. 102012205951.2, filed Apr. 12, 2012, which are hereby incorporated by reference in their entirety.

The invention relates to methods for curing and methods for coating a substrate with an uncured mixture B and/or sealant as well as for producing a cured sealant. Metallic substrates or coated metallic substrates as well as substrates from other groups of materials in particular may be coated in this way. Elements here are understood in particular to be construction elements. Matrices containing a curing agent as additive and sealants here are also used to coat substrates, to join and/or bond elements and to seal and/or fill hollow spaces and/or interspaces of elements.

The term "sealant" is used below in the sense of the present invention so that it also includes the concept of a matrix in the process of being cured in addition to including the fully cured sealing. The terms "matrix" and "(uncured) matrix A" refer to a mixture that has not yet been mixed with a curing agent. The term "mixture B" denotes a mixture of an uncured matrix A and a curing agent, which is prepared, after being mixed with a curing agent, as an uncured matrix or as a sealant already in the process of curing for use—i.e., in particular for coating a substrate—and is referred to as a sealant after the start of the curing process and after being cured with the curing agent. In statements of general validity below, for the sake of simplicity only matrices and sealants will be mentioned instead of using the more differentiated terms in speaking of matrices, mixtures containing a curing agent and sealants.

Mixtures B and sealants are used for a wide variety of purposes. They are of interest primarily in aviation and space travel but also in all cases where rapid curing on command deserves special attention because of a large quantity of matrix and/or sealant such as, for example, in land vehicles and aircraft in particular. These mixtures are used in particular for sealing structural elements, for joining sheet metal plates with existing structures, for example, such as segments of an aircraft and/or for preventing corrosion in locations where the anticorrosion coatings on metallic elements are damaged or removed in the vicinity of holes, for example. They may temporarily also assume a load-bearing function, for example, during shipping of structures which are used in construction and are subsequently also furnished with permanently load-bearing connecting elements.

Special demands are made of matrices and sealants for manufacturing and maintaining aircraft and space vehicles: sealing of the fuel tanks, corrosion prevention, aerodynamic smoothing and sealing of the pressurized fuselage, elasticity over a wide temperature range, resistance to various media such as fuels, hydraulic fluid, water of condensation and deicing fluid as well as a good sealing effect and adhesive effect on a wide variety of substrates are of primary interest here.

Manufacturing and servicing aircraft and space vehicles having a large number of connection points using sealants has in the past been extremely complex because the sealants used in the past, in particular those with a long processing time, have required a very long time for complete curing.

The disadvantage of the known sealants and methods for processing them and curing is that with a given processing time to be maintained, too little catalyst can be incorporated into the sealant to accelerate the curing process to the desired extent. This leads to the fact that, in particular with long processing times, the sealants may greatly retard work processes due to their long curing times associated with this complexity. However, such rapid and complete curing is also required of sealants having a long processing time.

The most rapidly curing sealants used today contain mercapto-terminated base polymers which allow a processing time of only approx. 10 or 15 minutes if they are to achieve a Shore A hardness of 30 within 60 minutes of curing. This stipulation is met only with great effort and with special sealant compositions.

There is also the problem that with the two-component sealants which preferably cure at room temperature, the time to achieve the tack-free time and the complete curing time are substantially longer than the processing time (see Table 1). The conventional coating methods are therefore often associated with extremely long cycle times in production (see Table 2).

As the criterion for a certain degree of curing, the time until reaching a Shore A hardness of 30, as defined according to ISO 7619, may be used. Furthermore, the tack-free time is extremely important as a measure of the curing of the sealant which begins at the surface of the sealant. Therefore the processing time should be as long as possible and the tack-free time and the complete curing time should be as short as possible. These parameters are usually based on the processing time, whereas the tack-free time and the complete curing time are determined by the type of sealant. Table 1 defines the time parameters that are important in curing of sealants. Table 2 gives an overview of typical times in the curing of sealants with mercapto-terminated base polymer according to the prior art and in comparison with the invention.

TABLE 1

Explanation of terms of the processing times relevant for sealants according to DIN 65262-1.

| Term | Definition |
| --- | --- |
| Processing time | Period of time from mixing the matrix and hardener, i.e., the start of curing until the sealant can no longer be applied because of its increased viscosity. |
| Tack-free time | Period of time from mixing the matrix and hardener, i.e., the start of curing until achieving a tack-free surface of the sealant. |
| Complete curing time | Period of time from mixing the matrix and hardener, i.e., the start of curing until achieving an initial hardness of Shore A 30. |

TABLE 2

Survey of trends and selected typical times in curing sealants according to prior art and according to the invention for mercapto-terminated base polymer.

| Term | Conventional sealants | | | Sealants according to the invention | | | |
|---|---|---|---|---|---|---|---|
| Processing time (min) | 10-15 | 240 | 3600 | 15 | 60 | 240 | 720-1440 |
| Tack-free time (min) | 30-120 | 360-1600 | approx. 60,000 | 0.2-2 | 0.2-2 | 0.2-2 | 0.2-2 |
| Complete curing time (min) | 60-240 | 1440-2880 | 86,400-100,800 | 15-30 | 48-96 | 150-300 | 360-720 |

The use of sealants in the manufacture or maintenance of aircraft has previously been a very complex process. The reason for this is the numerous joints having sealants, where sealants that often have very long processing times of approx. 12 to approx. 60 hours must be used, but then they require an extremely long time for complete curing and have required a very long tack-free time in the past in proportion to the length of the processing time. For example, an interlayer sealant of class C for the aviation field typically takes 60 to 70 days to achieve a Shore A hardness of 30 if the processing time is 60 hours. Furthermore, conventional type A and B sealants, which are usually applied over a surface or in the form of a bead for coating bolts, rivets or other structural elements typically need 2 to 5 hours to become tack-free if the processing time is 30 minutes, and typically take 5 to 8 hours to achieve a Shore A hardness of 30.

With the present invention, the required time can be reduced substantially due to the much shorter tack-free time and due to the much shorter complete curing time while at the same time the processing time is long enough. The cycle time for further use of the components coated with the sealant can be greatly reduced in this way.

The problem with the conventional high quality two-component sealants based on mercapto-terminated base polymer is that a comparatively high free catalyst content is required to quickly achieve a complete curing and a tack-free time. Then the processing time of the sealant is reduced greatly in proportion to the reduction in the tack-free time.

Conventional fast-curing polysulfide or polythioether-based sealants become tack-free only after approx. 50 to 120 minutes when the processing time is only 15 minutes, for example, and typically achieve a Shore A hardness of 30 only after approx. 90 to 240 minutes (Comparative Example VB2). It is difficult here to retain good physical properties such as tensile strength and elongation at break when reducing these times by increasing the rate of crosslinking.

Frequently a Shore A hardness of at least 35 or even just 30 is used, as the criterion for the mechanical load-bearing capacity of a slow-curing sealant, which is in the process of curing, in addition to or instead of using the tensile shear strength, because the sealant can no longer undergo plastic deformation at that Shore A hardness and will no longer be smudged in shipping, for example. A typical Shore A hardness for a completely cured sealant is often 45±10.

DE 101 08 136 A1 describes fast curing sealants having a long processing time. Temperature, IR radiation and mechanical forces are used there as triggers for rapid curing, and encapsulated or deactivated catalysts are also used to keep the processing time as long possible.

U.S. Pat. No. 3,645,816 describes a method for sealing leaks in liquid tanks using, for example, polysulfide sealants, wherein it is recommended that the sealant be heated to a temperature of 60° C. to 65° C. to accelerate curing and to achieve a particularly rapid tack-free time and curing, but this measure may be used only with certain sealants. Furthermore, it is very difficult to heat large substrates or those that are difficult to access.

UV-curing single-component or two-component coatings, which cure at room temperature and do not contain any sulfur-based polymers, are known, but they do not have the particularly high quality properties of aviation sealants such as a high resistance to various media such as fuel, hydraulic fluid, water of condensation and deicing liquid. These coatings are usually based on UV-curing mixtures containing acrylate prepolymers with double bonds, which undergo radical polymerization in the presence of a photoinitiator as a free radical generator and are able to cure. However, complete curing is not achieved with these sealants in the absence of UV radiation.

Furthermore, there are hardly any isocyanate-curing mercapto-terminated polymer systems available on the sealant market because they often cure much too rapidly and/or in an uncontrollable manner and because curing takes place uncontrollably.

For several decades, one goal that has been pursued in vain in the development of matrices and sealants is to develop a matrix and sealant that will permit a processing time of at least 0.5 hour, for example, or at least 4 hours or even approx. 10 hours at room temperature or at temperatures slightly higher than room temperature, without requiring a period of time several times longer than this for complete curing. Another goal that has also been pursued in vain for a long time is to develop a matrix and sealant that will start to cure on demand.

The object has been to develop a matrix and sealant as well as a process for coating substrates using this sealant with mercapto-terminated polymers, wherein the shortest possible curing times are achieved while maintaining long processing times. For use in the field of aviation and space travel, the sealant should if possible be able to achieve the same high quality properties as the conventional sealants used for these applications. These properties include a high resistance to various media, for example, resistance to fuels at room temperature, at 60° C. and at 100° C., hydraulic fluid, water of condensation and deicing liquid, a high thermal stability, a high cold flexibility, a high weather resistance, a high peel resistance on a variety of substrates, a high elongation at break and a high tensile strength.

Furthermore, the object has been to develop a matrix and sealant for the aviation industry in particular such that curing thereof will preferably begin "on demand." In the event of the absence of a demand, it is optionally also advantageous if the sealant will nevertheless cure completely, although with a time lag.

It has now been discovered that it is possible to produce matrices and sealants that can be cured on demand. It has now also been discovered that it is possible to produce matrices and sealants which have a very short tack-free time after irradiation with high-energy actinic radiation and may have a complete curing time that is approximately on the order of magnitude of the processing time (see Table 2). Furthermore, it has now also been discovered that these matrices and sealants have approximately the same high quality properties as conventional matrices and sealants for the aviation and space travel industries.

This object is achieved by a method for curing a mixture of a matrix and a curing agent based on sulfur-containing polymers, this method being characterized in that the curing takes place on demand and proceeds so rapidly that a tack-free surface of the sealant is achieved in a tack-free time of 0.05 to 5 minutes from the start of curing. In a preferred embodiment, the start of curing of mixture B coincides with the start of high-energy actinic radiation. The tack-free time is preferably 0.1 to 4 minutes, 0.2 to 3 or 0.3 to 2 minutes.

Therefore, it is possible to speak of a novel type of sealant with the matrices and sealants according to the present invention, this type of sealant being suitable in particular for airplanes, having a relatively long processing time and beginning to cure more rapidly only on demand but then curing in a greatly accelerated process. These sealants become tack-free particularly quickly.

This object is also achieved by a method for coating a substrate with mixture B or with the curing sealant formed therefrom, wherein mixture B and the sealant contain sulfur-based polymers, and this method is characterized in that mixture B is an uncured mixture of a matrix A and curing agent containing isocyanate,
the matrix A is uncured and contains a mercapto-terminated base polymer based on polyether, polythioether, polysulfide, its copolymers and/or mixtures thereof,
the uncured matrix A, the curing agent or both contain(s) at least one photoinitiator based on sterically hindered tertiary amine,
at least one photoinitiator splits off at least one free radical per molecule based on tertiary amine on exposure to high-energy actinic radiation, and an active catalyst is formed from this radical by uptake of hydrogen in particular, said catalyst acting as a catalyst for curing of the sealant, and
mixture B then cures in the temperature range from −10 to +70° C. after exposure to high-energy actinic radiation, whereupon it is referred to as a sealant as of the start of curing.

This may also be a method for joining elements, for sealing and/or filling hollow spaces and/or intermediate spaces of elements with an uncured mixture B as well as for producing a cured sealant.

An elevated temperature is not needed to activate the photoinitiator according to the invention or to make the resulting catalyst useful as a catalyst, but instead only high-energy actinic radiation such as UV light is required. This is also one of the advantages of the present invention, namely that curing can be performed at room temperature or at a temperature only slightly higher than room temperature such as, for example, at temperatures in the range of 10 to 50 or 30 to 40° C.

Under the influence of high-energy actinic radiation, at least one photoinitiator used according to the invention is capable of splitting off at least one free radical per molecule based on tertiary amine which is activated by uptake of H in particular and acts as a catalyst for the curing in particular. It is preferable here that the photoinitiator releases and/or forms an amine under the influence of high-energy actinic radiation and that the amine thereby released and/or formed catalyzes the reaction between mercapto-terminated base polymer and isocyanate-based curing agent. It is particularly preferable that the photoinitiator triggers and/or accelerates the reaction of isocyanate with mercaptan when mixture B is exposed to a high-energy actinic radiation and/or that the photoinitiator triggers the reaction of isocyanate with mercaptan and/or accelerates it when mixture B is exposed to a high-energy actinic radiation.

It has now also been discovered that quick curing and on demand curing sealants having high quality properties can be produced from mercapto-terminated base polymers and suitable additives if an isocyanate curing is selected and if photoinitiators are added, preferably in an amount, which releases at least one free radical based on tertiary amine per molecule under high-energy actinic radiation and thereby preferably form an amount of tertiary amine compound in the range of 0.05 to 5 wt % or in the range of 0.1 to 4 wt % with respect to the total composition of the sealant according to the invention. This amount of tertiary amine, as a catalyst itself, is sufficient to trigger the curing of sealants in layers up to approx. 7 mm thick or as beads or strings of sealant.

Under the influence of high-energy actinic radiation on mixture B and/or on the sealant which is already curing, at least one free radical is released per molecule based on tertiary amine by at least one photoinitiator when it is split. The photoinitiator here is not used for free radical curing of acrylates and methacrylates, for example, as would otherwise be the case, but instead is used to trigger a chemical reaction of isocyanate with the mercapto-terminated "base polymer" selected from polymers and/or copolymers, which may optionally also contain 0.001 to 20 or 0.5 to 6 wt % of monomers and/or oligomers in the form of a polyaddition or none at all, because acrylates and methacrylates as well as other organic polymer systems from the prior art have a number of double bonds, which are not usually present in the mercapto-terminated base polymers of the present patent application. Furthermore, in free radical curing of (meth) acrylate, mainly or only the benzoyl radical is required, whereas the tertiary amine formed from the α-aminoalkyl radical is required in curing of the mercapto-terminated base polymer, whereas the benzoyl radical is not needed with the method according to the present invention.

As far as the patent applicant is aware, the mercapto-terminated base polymers cannot be polymerized with a photoinitiator in a free radical reaction by the methods according to the prior art without the presence of compounds or groups having double bonds, e.g., compounds based on (meth)acrylate. However, such amounts with double bonds of the matrix according to the invention or sealant are not usually added, so that then no free radical curing can take place according to the information available to the present applicant.

The chemical composition of many UV curing accelerators from the prior art is based on acrylates whose cross-linking is triggered by exposure to UV light, in particular in the presence of photoinitiators. With greater layer thicknesses, however, the UV light can penetrate only partially into such coatings, so that curing of layers with a thickness of more than 200 μm, for example, is impractical in practice.

The present invention, however, is based on utilization of the chemical reaction of isocyanate groups with mercapto groups in the presence of tertiary amine which evidently acts as a catalyst for this reaction. It is also possible here for sealant layer thicknesses much greater than 200 μm to react thoroughly, and in particular layers up to approx. 7 mm thick may be cured because the amine that is released by the photoinitiator and is then reacted to form the catalytically active amine may be distributed over a greater distance through the sealant.

The present invention relates to a chemical curing in which the photoinitiator according to the invention is used for a remote purpose and is generally used only for the release of the amine radical and for forming a catalyst based on tertiary amine, but not as a photoinitiator in the actual sense which is used in general.

It has also surprisingly been found that the method according to the invention functions well even at curing temperatures below 0° C. Preferably little or almost no heat is supplied from externally to the chemical system, but instead mixture B, i.e., the sealant cures when exposed to high-energy actinic radiation preferably or entirely in the temperature range from −10 to +60° C. or from +5 to +60° C. A temperature above 60° C. is provided or established only rarely in the process according to the invention. One advantage of the process according to the invention is that no elevated temperatures are required. Furthermore, temperatures above 80° C. may occur in the component because of the stresses due to thermal expansion and may thus have a negative effect on the quality of the neighboring components such as aluminum alloys and fiber composite materials. Heating to more than 40° C. or even to more than 60° C. usually occurs—if at all—only because of the actinic radiation and the optionally exothermic chemical reactions and usually only for a period of time in the range of approx. 1 minute up to 15 minutes. The curing preferably takes place at temperatures in the range of 1 to 60° C., from 5 to 50° C., from 10 to 40° C., whereby in individual cases, a temperature of more than 60° C. and up to 70° C. is utilized for a period of only 0.1 to 15 minutes. It is particularly preferable for curing to be performed in the range of 1 to 40° C. for the entire period of time. Curing here particularly preferably takes place at temperatures below 40° C. for all or most of the time.

The matrix and/or sealant according to the invention preferably has/have at least one photoinitiator, which is a compound based on at least one tertiary amino group that is sterically hindered. The photoinitiator according to the invention may have different structures. One important group of photoinitiators that can be used according to the invention is the α-aminoketones. The photoinitiator is preferably selected from those based on sterically hindered amine, which releases and/or forms a tertiary amine on exposure to high-energy actinic radiation. The preferred photoinitiators are those that split off one, two or three tertiary amine radicals on exposure to high-energy actinic radiation and/or form at least one compound with one, two or three tertiary amino groups per molecule.

The photoinitiator according to the invention is optionally a latent catalyst, from which the active catalyst is still to be released or formed. However, such photoinitiators may optionally also have a very low catalytic effect, even before the high-energy actinic radiation.

The photoinitiator according to the invention preferably belongs to the class of α-aminoketones because the chemical structure of these photoinitiators allows the release of an amine radical and the formation of a tertiary amine after high-energy actinic radiation, which initiates and/or accelerates the reaction between the mercapto-terminated polymer and the isocyanate-based curing agent. This ensures a processing time of the mixture B according to the invention after mixing the two components for a period of time, which is often in the range of 15 minutes to 48 hours, preferably from 20 minutes to 20 hours or from 30 minutes to 4 hours—as long as there is no radiation with high-energy actinic radiation. Mixture B is thus an uncured mixture to the extent that no intense curing has begun during the time of production and storage of mixture B and its starting compounds.

When the matrix and/or sealant is/are exposed to a high-energy actinic radiation, this results in curing in the range from "on demand" curing to a particularly rapid surface curing, which is determined by the tack-free time, and to a rapid and complete curing. A tack-free layer is formed on the outside at first here, followed by rapid curing at deeper layers. Times in the range of 0.01 to 10 minutes for the tack-free time and 1 to 1000 minutes for thorough curing are often achieved here, depending on the layer thickness. The times achieved for sealants with a thickness of 1 mm to be thoroughly irradiated are often in the range of 0.01 to 4 minutes for the tack-free time and 1 to 200 minutes for complete curing, depending on the layer thickness. The times achieved for sealants with a thickness of 4 mm to be thoroughly irradiated are often in the range of 0.01 to 4 minutes for the tack-free time and 5 to 800 minutes for complete curing, depending on the layer thickness. Times for sealants with a thickness of 7 mm to be thoroughly irradiated are often in the range of 0.01 to 4 minutes for the tack-free time and 10 to 1000 minutes for complete curing, depending on the layer thickness.

The photoinitiator may be present as a component of the matrix A and/or of the curing agent. Therefore the photoinitiator is also a component of mixture B which is prepared for use. The photoinitiator preferably serves as a latent catalyst which supplies the tertiary amine that acts as the catalyst.

In comparison with that, primary and/or secondary amines also react with isocyanate even without activation such as heating or radiation, for example. They are irrelevant within the context of this invention, however, because they do not act as catalysts at all or almost at all, but instead act as reactants, forming in the reaction urea derivatives which also do not serve as catalysts at all or almost at all. The catalytically active primary and/or secondary amines are consumed in the reaction and are converted into substances that act non-catalytically. In small amounts, however, these substances usually do not cause interference with the sealant, but they are also not of any benefit either.

At least one photoinitiator is preferably a compound based on sterically hindered tertiary amine according to the general formula [1]

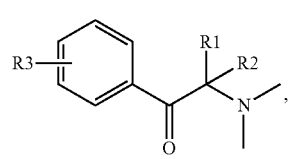

[1]

wherein one, two or three tertiary amino groups per molecule may be present and wherein R1 is, independently of one another, H, OH, $CH_3$, $CH_3CH_2$, tertiary amine N—$(R4)_2$, cyclohexane, toluene, ethylbenzene or ethylmethylbenzene, wherein R2 is, independently of one another, H, OH, $CH_3$, $CH_3CH_2$, N—$(R4)_2$, cyclohexane, toluene, ethylbenzene or ethylmethylbenzene, wherein R3 is, independently of one another, H, OH, $CH_3$, $CH_3O$, S—$CH_3$ or morpholine and R4 is $CH_3$ or $CH_3CH_2$ independently of one another.

According to the present invention, at least one photoinitiator based on sterically hindered tertiary amine is cleaved because of the actinic radiation, in particular according to equation (1), forming at least two different radicals. At least one benzoyl radical and at least one α-aminoalkyl radical is formed here per molecule of photoinitiator. According to this, these radicals are preferably converted into compounds according to equations (2) and (3). Benzaldehydes and tertiary alkylamines are formed here.

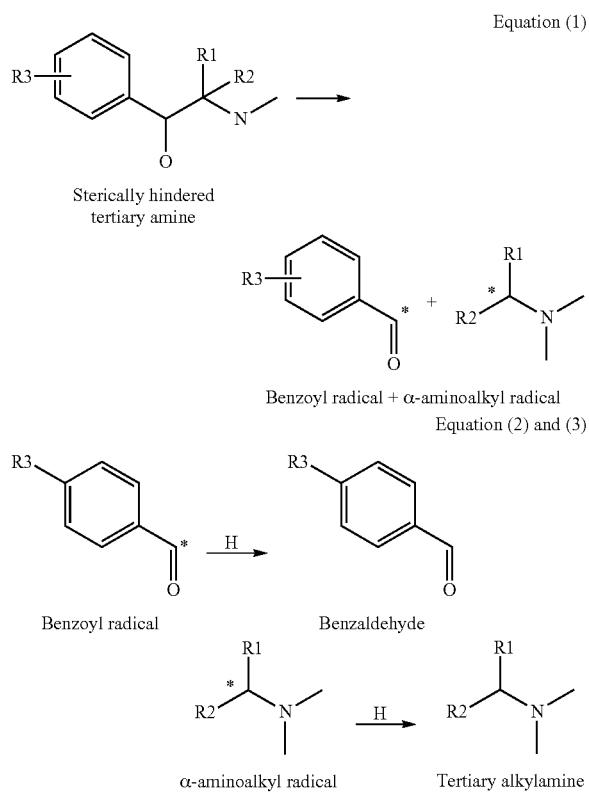

The tertiary alkylamines here serve as a catalyst while the benzaldehydes do not usually cause interference with the mercapto-terminated polymer systems, but also do not manifest any positive effect.

It is preferable for the photoinitiator of the matrix and/or sealant according to the invention to be an α-aminoketone. It is preferable in particular for at least one photoinitiator to be an α-aminoketone having one, two or three tertiary amino groups and in particular having a number of carbon atoms in the range of 10 to 60 and having a molecular weight in the range of 190 to 750 g/mol. In preferred embodiments here the photoinitiator is split into two different radicals, forming a) at least one benzoyl radical with a number of carbon atoms per radical in the range from 8 to 25, from 8 to 20 or from 8 to 12 and having a molecular weight in the range from 106 to 270 g/mol, from 120 to 240 g/mol or from 176 to 200 g/mol, and b) at least one α-aminoalkyl radical with a number of carbon atoms per radical in the range from 3 to 30, from 8 to 25 or from 13 to 20 and having a molecular weight from 87 to 400 g/mol, from 150 to 300 g/mol or from 192 to 250 g/mol. Then, a tertiary alkylamine is formed from the radical based on α-aminoalkyl by abstraction of H with a number of carbon atoms per molecule in the range from 3 to 30, from 8 to 25 or from 13 to 20 and with a molecular weight in the range from 87 to 400 g/mol, from 150 to 300 g/mol or from 192 to 250 g/mol. The tertiary alkylamine has a greater basicity than the corresponding photoinitiator and evidently functions as a catalyst.

Photoinitiators that belong to the group of α-aminoketones and have at least one sterically hindered amino group in a position are particularly preferred, such as the photoinitiators 2-dimethylamino-2-(4-methylbenzyl)-1-(4-morpholin-4-ylphenyl)butan-1-one, 2-benzyl-2-dimethylamino-1-(4-morpholino-phenyl)butan-1-one and/or 2-methyl-1-[4-(methylthio)phenyl]-2-morpholinopropan-1-one, for example.

In particularly preferred embodiments, the photoinitiators such as 2-dimethylamino-2-(4-methylbenzyl)-1-(4-morpholin-4-ylphenyl)butan-1-one and/or 2-benzyl-2-dimethylamino-1-(4-morpholinophenyl)butan-1-one are split as a result of the UV radiation into the 4-morpholinobenzoyl radical and the benzene ethanamine-α-ethyl-N,N,4-trimethyl radical and/or into the 4-morpholinobenzoyl radical and benzene ethanamine-α-ethyl-N,N-dimethyl radical. The benzene ethanamine-α-ethyl-N,N,4-trimethyl radical and the benzene ethanamine-α-ethyl-N,N-dimethyl radical usually do not have any catalytic activity for the curing reaction. Then a tertiary alkylamine, such as benzene-ethanamine-α-ethyl-N,N,4-trimethyl can be formed by H abstraction from a radical such as benzene-ethanamine-α-ethyl-N,N-4-trimethyl radical. Uptake of hydrogen into the radical may be accomplished, for example, from the hydrogen groups of the polymers that are present and/or other organic compounds that are present. The tertiary alkylamines that are formed usually have a greater basicity than the photoinitiator and obviously act as catalyst. The greater basicity of the newly formed tertiary amine in comparison with the basicity of the photoinitiator can be measured in principle by the $pK_s$ value. The greater basicity has the advantage and/or the effect that the reaction between thiol and isocyanate is accelerated and the sealant cures especially rapidly.

The photoinitiators mentioned last are used in acrylate-based UV-curing coatings according to the prior art. In the present invention, they also surprisingly trigger the reaction of isocyanate with mercaptan and/or accelerate it when the mixture B is exposed to a high-energy actinic radiation such as UV light. It was surprising that a photoinitiator that releases comparatively small amounts of tertiary amine radical would provide sufficient quantities of tertiary amine compound having a catalytic activity for the curing of matrices.

Furthermore, photosensitizers may also be used. In principle, any photosensitizer that shifts the absorption spectrum into the desired wavelength range of the radiation to be utilized and in particular into the UVA range may be used. This is because the UVA range is particularly suitable for thicker layers, and UVA radiation does not cause any ozone production. In comparison with photoinitiators, the photosensitizers shifts the absorption spectrum from the short wavelength UV range of UVC 200-280 nm and/or UVB 280-315 nm to the long wavelength UV range of UVA 315-380 nm, for example.

Therefore, mixtures of photosensitizers and photoinitiators may also be used advantageously to specifically adjust the absorption wavelength(s) of the matrix and/or the sealant with the help of at least one photosensitizer. The photosensitizers used are preferably photoinitiators which do not release any tertiary amine, but which help to adjust the absorption wavelengths in a manner suitable for the respective application. Examples include mixtures selected from, for example, at least one photosensitizer selected from benzophenone and isopropylthioxanthone ITX with at least one photoinitiator based on sterically hindered amine such as, for example, 2-dimethylamino-2-(4-methylbenzyl)-1-(4-morpholin-4-ylphenyl)butan-1-one, 2-benzyl-2-dimethylamino-1-(4-morpholinophenyl)butan-1-one and/or 2-methyl-1-[4-(methylthio)phenyl]-2-morpholinopropan-1-one.

Curing occurs due to a chemical reaction of the mercapto groups with the isocyanate groups, forming at least one thiourethane. The steric hindrance is eliminated due to the cleavage of the radical from the photoinitiator. The active catalyst, which has an increased basicity and is no longer sterically hindered, is formed from the radical only by uptake of H.

In the method according to the invention, the release of radicals is not utilized or is utilized only to a subordinate extent with the photoinitiator, as is otherwise the case with a radical crosslinking, e.g., UV curing, but instead the only processes or the main processes are the release of the free radical and the formation of an amine as the catalyst. The photoinitiator here seems to act like a latent catalyst. After splitting off the amine radical from the photoinitiator, after formation of an amine compound and even after catalysis of the curing process, the amine is still present in free form and continues to have a catalytic activity even after the end of the high-energy actinic radiation, so that there is usually even a catalytic post-curing process. Curing of the sealant continues in catalytic post-curing even after the end of the high energy radiation. This is clearly something special in comparison with curing that uses acrylate-based compositions.

The chemical reaction between the base polymer and the curing agent is triggered and/or accelerated by the action of high-energy actinic radiation. It is thus possible to trigger the on demand curing. The command is in the form of the high-energy actinic radiation, for example, UV radiation. It is thus possible to specify the point in time of the onset of curing and be able to trigger the onset of curing. Mixture B is referred to as the sealant starting with the onset of curing.

The reaction of isocyanate groups with mercapto groups is the main reaction in curing the sealant. In addition, for example, a reaction of isocyanate with at least one alcohol may also occur. Alcohols which contain in particular two to twelve carbon atoms, independently of one another and have one, two or three OH groups may function as reactants here. The reaction of at least one such alcohol with isocyanate groups results in polyurethane compounds. Therefore the mechanical properties can be influenced in a positive sense. It is therefore advantageous with many embodiments to add an amount in the range of 0.1 to 10 wt % of at least one such alcohol. However, it is advantageous that the reaction between isocyanate groups and mercapto groups is dominant and only up to 10% of the reactions of isocyanate groups are with at least one alcohol. It is therefore preferable for the total amount of isocyanate groups to be present in at least a stoichiometric ratio of approx. 1:1 or at least 1:1, preferably in an excess in relation to the total mercapto group content and hydroxyl group content in the mixture B and in the sealant.

With the method according to the invention, the photoinitiator is activated by the action of high-energy actinic radiation, but the photoinitiator is not used as it is otherwise with radical curing coatings, but instead it is used primarily only to release a tertiary amine radical. The tertiary amine radical is usually converted immediately into a tertiary amine compound without requiring any special measures. The tertiary amine radical thereby released forms an amine from this, in particular with hydrogen, and then this amine serves to catalytically trigger and/or catalytically accelerate the chemical reaction between isocyanate groups and mercapto groups in the chemical curing. The tertiary amine thereby formed evidently permits and/or accelerates as a catalyst the curing reaction(s). The tertiary amine thereby formed triggers the reactions between the components of the matrix and of the curing agent and/or accelerates them. It can apparently act mainly as a catalyst for curing with isocyanates at both low and high temperatures.

Actinic radiation such as UV radiation may be continued in principle for 1 second to 6 hours. It preferably takes place over a period of time from 1 second to 15 minutes, depending on the layer thickness and/or depending on the radiation source, but even longer radiation times may be used in principle. In many cases, however, no significant improvement can be achieved after 5 minutes. Actinic radiation in the period of time from 5 seconds to 2 minutes is usually sufficient if a UV radiation dose of at least 80 mJ/cm$^2$ is used. Therefore, a UV radiation of 100±20 mJ/cm$^2$ is usually sufficient. In many embodiments a catalytic secondary curing often takes place after radiation or even in the absence of a prior radiation with a high-energy actinic radiation, and this secondary curing may often last for several hours or even several days. Therefore, this catalytic secondary curing ensures that the sealant will always achieve a high quality in use, in particular in locations that have little or no accessibility for the radiation, regardless of whether, where and how much active catalyst is formed.

In particular UV radiation may be used as the high-energy actinic radiation, but as an alternative or in addition to this, electron radiation may also be used. These types of radiation have proven successful because they comprise the energy range required for activation of the photoinitiator, in particular UV light with UVC, UVB, UVA and/or UVVIS radiation. At least one UV lamp, such as, for example, at least one powerful UV lamp, preferably with a power of more than 400 W, at least one low power UV lamp with a power of less than 120 W and/or at least one UV LED, at least one fluorescent lamp for UV radiation and/or at least one electron lamp may be used for this purpose. No ozone is formed when working in the UVA range and furthermore, curing of layers with a greater thickness such as, for example, approx. 2 to 7 mm is also possible.

For the sake of simplicity, frequently only UV light and/or UV radiation is mentioned below although the invention is not limited to such wavelengths. In practice, however, UV light is the most commonly used.

In comparison with conventional sealants without high-energy actinic radiation and without this catalytic reaction, the reaction according to the invention is greatly accelerated. The triggering of the reaction by high-energy radiation is recognizable due to the very rapid surface curing, which in some cases takes place within seconds. The acceleration of the reaction is discernible by the accelerated and thorough curing.

In the method according to the invention, the sealant may have a Shore A hardness of at least 10, measured 5 to 600 minutes after the onset of high-energy actinic radiation and/or a Shore A hardness in the range of 30 to 60, measured 2 weeks after the onset of the high-energy actinic radiation. The significant increase in hardness also takes place due to the secondary curing until complete and thorough curing is achieved. Depending on the photoinitiator content and the tertiary amine content, the speed can be controlled here: the higher these contents, the faster the curing may take place. If curing proceeds more rapidly, then shorter processing times are also the result.

The photoinitiators mentioned last are used in acrylate-based UV curing coatings according to the prior art. In the present invention, they also surprisingly trigger the reaction of isocyanates with mercaptans and/or accelerate it when mixture B is exposed to high-energy actinic radiation. It was surprising that a photoinitiator which releases comparatively small amounts of tertiary amine radical would provide sufficient amounts of tertiary amine compound having a catalytic activity for curing of matrices.

Curing of even thicker layers is surprisingly also possible with the sealant system that has been discovered because the isocyanate-mercaptan reaction is already greatly accelerated by even very small amounts of a catalyst, in particular a tertiary amine, so that even small amounts of high-energy actinic radiation are sufficient to release an amine radical and to form the corresponding traces of amine.

The chemical composition of the matrix (matrices) A and/or B as well as the chemical composition of the curing sealant may be selected so that the high-energy actinic radiation such as UV light, for example, is absorbed here only to a slight extent. The main components of a matrix or sealant are usually readily permeable for high-energy actinic radiation. In particular with the fillers, attention should preferably be paid to the fact that they are as permeable as possible for the selected radiation. Electron beams usually penetrate through the substances of a matrix or sealant to a much greater extent than UV light. It is therefore preferable when adding fillers and other additives to one of the compositions to select those that absorb little or none of the selected type of UV light in particular, for example, i.e., they absorb little or none of the UV light so they have the greatest possible permeability for the selected type of radiation with which curing is to be initiated. They preferably exhibit little or no absorption in the range of the UV light spectrum or of the UV light used for the incident radiation. Fillers are usually added to a mixture and/or to the sealant to achieve better mechanical properties. Fillers based on calcium carbonate and micro-hollow beads of glass or plastic in particular should be tested for their radiation permeability as needed.

It is therefore preferable for no substances or only up to 1 wt % or only up to 5 wt % of substances such as fillers to be added to the matrix and the curing agent, wherein these fillers have a significant absorption or absorption significantly greater than the absorption of the sulfur-containing polymers of the matrix in the range of the high-energy actinic radiation to be used.

Another great advantage of the invention is that after the start of curing and even without exposure to UV light, a reliable and complete curing is achieved, even if it only occurs after a lengthy period of time such as, for example, after 1 to 21 days. This is important for applications in which the sealant is introduced into cavities and/or into gaps between components and/or is otherwise shielded against UV light, for example. It is important in particular in the production of aircraft to be sure that the most complete possible curing of all matrix introduced during production is achieved with the curing agent in all applications.

A matrix and/or sealant based on sulfur-containing base polymers such as, for example, mercapto-terminated polyethers, mercapto-terminated polythioethers, mercapto-terminated polysulfide, the copolymers and/or mixtures thereof, which are used here as the base polymers, are particularly preferred. Preferably no epoxidized base polymers are used here because epoxidized polysulfides have the disadvantage that they are often difficult to control in their reaction rate such as isocyanates or amines, for example.

Furthermore, cured sealants based on epoxidized polysulfides have mechanical properties such as tensile strength and elongation which do not usually meet the requirements of high quality aviation sealants.

A matrix based on polysulfide with terminal mercapto groups, their copolymers and/or mixtures thereof is most especially preferred. The copolymers may in particular be copolymers based on polyether-polythioether, polyether-polysulfide and/or polythioether-polysulfide.

Long-chain polymers with a molecular weight in particular in the range of 2800 to 9000 g/mol are preferably used as the mercapto-terminated polysulfide polymers in the compositions according to the invention of matrix A, mixture B and the sealant produced therefrom, such as Thioplast® G131, for example, especially preferably with a molecular weight in the range of 3300 to 5000 g/mol such as Thioplast® G10, Thioplast® G12, Thioplast® G1, Thiokol® LP 32 and/or Thiokol® LP 12, for example.

Short-chain polymers with a molecular weight in the range of 100 to 3200 g/mol in particular, from 400 to 2800 g/mol and/or from 500 to 1200 g/mol, such as, for example, Thiokol® LP3, Thioplast® G4, Thioplast® G22 or Thioplast® G44 are used as the mercapto-terminated polysulfide polymers in the compositions according to the invention of matrix A, mixture B and the sealant produced from them—optionally in addition.

In a preferred embodiment, preferably, on the one hand, long-chain polymers with a molecular weight in particular in the range of 2800 to 9000 g/mol or with a molecular weight in the range of 3300 to 5000 g/mol and, on the other hand, short-chained polymers with a molecular weight in the range of 400 to 2800 g/mol or from 500 to 1200 g/mol are preferably used as mercapto-terminated polysulfide polymers and/or as mercapto-terminated polythioethers in the compositions according to the invention of matrix A, mixture B and the sealant produced therefrom, wherein the ratio of the long-chain polymer to the short-chain polymers is preferably in the range of 25:1 to 0.5:1, from 10:1 to 1:1 or from 6:1 to 2:1.

Preferably liquid polymers with a molecular weight in particular in the range from 100 to 7000 g/mol or from 500 to 6000 g/mol are used as the mercapto-terminated polyether polymers in the compositions according to the invention of matrix A, mixture B and the sealant produced therefrom, especially preferably those liquid polymers having a molecular weight in the range of 1000 to 3000 g/mol, which are accordingly also present in the sealant produced therefrom.

In the compositions according to the invention of matrix A, mixture B and the sealant produced therefrom, preferably liquid polymers with a molecular weight in particular in the range from 500 to 6000 g/mol, especially preferably with a molecular weight in the range of 1000 to 3000 g/mol are used as the mercapto-terminated polythioether polymers.

The sulfur-containing base polymers preferably have a mercaptan content, based on the reactive SH groups to the total base polymer, in the range of 0.5 to 10 wt %, 0.8 to 8 wt % or from 1 to 6 wt %.

The sulfur-containing base polymers preferably have a total sulfur content in the range of 1 to 50 wt %, 2 to 45 wt % or 10 to 38 wt %.

The sulfur-containing base polymers preferably have an average functionality as reactive end groups of mercapto groups per molecule in the range of 1.5 to 2.5 or 1.9 to 2.2. On the other hand, in many embodiments it is preferable not to use any hydroxy-functionalized sulfur-containing base polymers. Especially preferably no other functionalities than reactive end groups are present as mercapto groups in the sulfur-containing base polymer.

The sulfur-containing base polymers preferably have an average glass transition temperature $T_g$ in the range of −80 to −30° C. or −60 to −40° C., measured according to AITM 1-0003 Airbus Industry Test Method of June 1995.

The fuel resistance improves with a higher sulfur content. The base polymer and/or the compound containing the base polymer such as the matrix A, matrix B and/or the sealant may optionally also contain 0 or 0.001 to 10 or 0.01 to 5 wt % of other oligomers and/or polymers in addition to the mercapto-terminated polymers/copolymers, in particular those selected from the short-chain organic sulfides and/or the short-chain organic thioethers. These short-chain molecules may contribute toward a crosslinking and/or a change in the viscosity of the base polymer. If there is an oligomer content in the base polymer, this often has the advantage that the mechanical properties can be further improved and/or thereby adjusted.

On the other hand, alcohols without double bonds and having up to 12 carbon atoms per molecule and/or polyols without double bonds and having 4 to 100 carbon atoms per molecule may be added in a total amount of up to 10 wt % to a matrix and/or sealant. These compounds may help, for example, to modify the mechanical properties of the sealants. They preferably have a molecular weight in the range of 100 to 3000 g/mol. The following types of alcohols and polyols are especially preferred here: saturated alcohol, polyester polyol, polyether polyol, polycarbonate polyol and mixtures thereof. They may also play a role to a subordinate extent as crosslinking agents in the curing of the sealant, like the silanes/silanols/siloxanes, which are referred to here simply as "silanes." Silanes are adhesion promoters, but not all silanes here additionally function as crosslinking agents.

To adjust the mechanical properties of the sealant in particular, at least one alcohol and/or at least one polyol may be added as needed to the matrix A, the curing agent and/or to mixture B. Preferably at least one polyol such as, for example, at least one polyester polyol, polyether polyol and/or polycarbonate polyol may be present in the base polymer, wherein preferably 0.001 to 15 or 0.1 to 8 wt %, based on the base polymer, may optionally be present in the base polymer. Such a polyol content in the base polymer causes a change in the kinetic and mechanical properties in particular and possibly also in the viscosity.

The composition according to the invention is either a matrix A in which the curing agent is still to be added for use, or a single-component matrix B in which a curing agent is added to matrix A, wherein the single-component composition is referred to as mixture B and can be frozen preferably at least for a long storage time. The main component of the sealant system and/or the composition is a system consisting of at least two components, an uncured matrix A and a curing agent based on isocyanate plus the single-component mixture B, i.e., the sealant, produced therefrom by mixing them together. All the matrices and/or sealants here contain at least one type of mercapto-terminated base polymer. Each advantageously contains at least one mercapto-terminated base polymer based on polysulfide, a mercapto-terminated base polymer based on polythioether and/or a mercapto-terminated base polymer based on polysulfide and polythioether which may also be present as a polymer blend and/or as a copolymer, for example, as a block copolymer. The sealant system, the uncured matrix A, the curing agent and/or mixture B are characterized in that it/they contain(s) at least one photoinitiator which releases and/or forms a tertiary amine, and that the amine thereby released and/or formed catalyzes the curing process with an isocyanate-containing curing agent.

It is preferable for the matrix and/or the sealant to be free of:
(meth)acrylate-based compounds/polymers,
more than 10 wt %, more than 4 wt % or even entirely free of all polyols with 4 to 100 carbon atoms per molecule, such as in particular polyester polyols, polyether polyols, polycarbonate polyols and/or polyurethane polyols, each having 4 to 100 carbon atoms per molecule and/or short-chain alcohols with up to five carbon atoms,
catalysts based on metals,
all other types of polyenes, organic polymers and organic copolymers having double bonds, except for silanes, such as, for example, vinyl silanes, acrylic silanes and methacrylic silanes,
epoxidized base polymers,
styrenes,
vinyl-containing polymers/copolymers,
more than 5 wt % of silane/siloxane-terminated base polymers,
polyurethanes that contain polyol which acts as a plasticizer, of more than 10 wt %,
substances which absorb a great deal of UV light, such as UV light-absorbing pigments, e.g., $TiO_2$,
chromate contents,
more than 2 wt % carboxylic acids,
more than 2 wt % mineral acids and/or
more than 0.5 wt % water.

Depending on the embodiment, the matrices and/or sealants may be free of some or all of the aforementioned contents and additives. In many embodiments it is preferable not to add any epoxidized base polymers such as, for example, epoxidized polysulfides. Furthermore, in many embodiments it is preferable not to add any resins having a double bond.

The curing agent in the present patent application is always based on isocyanate. The curing agent is usually free of manganese oxide, free of inorganic peroxide, free of organic peroxide, free or practically free of water and/or often free of plasticizers. The isocyanate is preferably added only to the curing agent. Therefore, curing of the sealant takes place with at least one isocyanate-based compound.

The at least one isocyanate-based compound is in some cases referred to below as "isocyanate" in an undifferentiated manner, regardless of whether referring to monomers, oligomers, polymers and/or copolymers. In the sense of the present patent application, the term "isocyanate" always denotes at least one aliphatic, cycloaliphatic and/or aromatic isocyanate based on monofunctional, difunctional and/or trifunctional monomeric isocyanate, based on monofunctional, difunctional and/or trifunctional oligomeric and/or polymeric isocyanate (all of them referred to as polyisocyanate) and/or based on monofunctional, difunctional and/or trifunctional isocyanate prepolymers. At least one such isocyanate compound here is selected from this group. The term "isocyanate" here also includes isocyanate groups in general. It is therefore preferable for at least one compound to be selected as the isocyanate-based compound by selecting from aliphatic, cycloaliphatic and/or aromatic isocyanate based on monofunctional, difunctional and/or trifunctional monomeric isocyanate, based on monofunctional, difunctional and/or trifunctional oligomeric and/or polymeric isocyanate, and/or based on monofunctional, difunctional and/or trifunctional isocyanate prepolymers.

All these isocyanates are preferably miscible with one another because they are all preferably present in liquid form. Isocyanate serves as a reactant in particular for the mercapto groups of the base polymer. The curing conditions and the mechanical properties of the sealants are influenced to a significant extent through the selection of the isocyanate(s). Preferably, none of these isocyanates are blocked or even partially blocked. The isocyanate is preferably halogen-free and/or free of blocking groups, such as, for example, diethyl malonate, 3,5-dimethylpyrazole or caprolactam.

The isocyanate groups may be bound to at least one alkyl group, such as, for example, at least one alkyl group having 6 to 12 carbon atoms, such as at least one alkyl group selected from $C_6H_{12}$ to $C_{12}H_{24}$, at least one phenyl group, at least one toluyl group, at least one diphenylalkyl group, at least one cyclohexyl group and/or at least one polymer/copolymer.

The curing agent contains at least one isocyanate-based compound. The isocyanate is used as a curing agent. The curing agent preferably contains at least one isocyanate with a total isocyanate-based compound content in the range of 20 to 100, 30 to 98, 40 to 95, 50 to 90 wt %, 60 to 85 or 70 to 80 wt %. It is possible here to use the entire desired amount of isocyanate in the form of isocyanate-terminated prepolymers.

The isocyanate groups of the isocyanate here will react chemically with the mercapto groups in particular those of the base polymer and optionally also with a small amount of other mercaptan-based compounds such as, for example, mercaptopropyltrimethoxysilane. Such a compound may be added to the matrix or mixture B in particular in an amount of 0.1 to 5 wt %, to adjust the mechanical properties and the adhesion. Furthermore, chemical reactions may optionally also occur between the isocyanate and at least one alcohol.

Although the functionality of the isocyanate may principally be in the range of 1 to 4, there is usually a mixture of various functionalities. The functionality of the at least one isocyanate used as the curing agent is preferably on the average in the range of 1.5 to 3.6 or 2.0 to 3.2. The isocyanate is preferably in each case at least one aliphatic, cycloaliphatic, and/or aromatic isocyanate with in each case an average of one to four isocyanate groups per molecule, independently of one another, and/or at least one prepolymer having at least an average of 1.6 to 4.0 isocyanate groups per molecule.

The isocyanate is particularly preferably added to the curing agent in the form of monomers, oligomers and/or prepolymers based on hexamethylene diisocyanate HDI=HMDI, isophorone diisocyanate IPDI, diphenylmethane diisocyanate MDI and/or toluene diisocyanate TDI.

If the isocyanate is a polyisocyanate, then at least one hexamethylene polyisocyanate, at least one isophorone polyisocyanate, at least one toluene polyisocyanate and/or at least one diphenylmethane polyisocyanate is/are preferably used.

The isocyanate is particularly preferably one based in each case on at least one isocyanate-terminated prepolymer, preferably prepolymers with a backbone based on polyol, polyester, polyether, polysulfide and/or polythioether and/or preferably in the form of their monomers and/or oligomers. The isocyanate-terminated prepolymers are particularly preferably the reaction products of monomers, oligomers and/or polymers of isocyanates and in particular of diisocyanates with sulfur-containing compounds which optionally will also be polymerized. They are preferably based on at least one monomeric and/or oligomeric diphenylmethane diisocyanate, based in each case on at least one monomeric and/or oligomeric toluene diisocyanate, based in each case on at least one monomeric and/or oligomeric hexamethylene diisocyanate, based in each case on at least one HDI biuret, HDI dimer, HDI trimer and/or isophorone diisocyanate and/or based on at least one polyisocyanate such as, for example, diphenylmethane polyisocyanate, TDI polyisocyanate and/or HDI polyisocyanate.

In a particularly preferred embodiment, the matrix A, the mixture B and the sealant produced therefrom have as the chemical base at least one isocyanate-terminated polysulfide polymer without terminal mercapto groups which functions as a curing agent and not as base polymer. This polymer is preferably present as a liquid or highly viscose polymer having a molecular weight in particular in the range of 200 to 6000 g/mol and particularly preferably with a molecular weight in the range of 1000 to 3000 g/mol.

Examples of isocyanate-terminated prepolymers include the reaction products of isocyanate-based monomers and/or oligomers with at least one polyol and/or with at least one mercapto-terminated polymer/copolymer. Examples of preferred isocyanate-terminated prepolymers include MDI-, TDI- or HDI-terminated polysulfides having a molecular weight of 500 to 7000 g/mol, MDI-terminated or TDI-terminated monosulfides having a molecular weight of 500 to 7000 g/mol, MDI-terminated, TDI-terminated or HDI-terminated polyesters having a molecular weight in the range of 500 to 6000 g/mol and/or MDI-terminated, TDI-terminated or HDI-terminated polyethers with a molecular weight of 500 to 6000 g/mol.

The main component of the curing agent according to the invention (component B) is in particular preferably at least one isocyanate-based compound that is selected in particular from diphenylmethane diisocyanates, from polyisocyanates based on hexamethylene diisocyanates such as, for example, HDI trimers and/or HDI biurets, based on diphenylmethane diisocyanates, based on isophorone diisocyanates and based on toluene diisocyanates as well as isocyanate-terminated prepolymers.

It has surprisingly been found here that isocyanates based on MDI in particular, such as 4,4'-diphenylmethane diisocyanate, 2,4'-diphenylmethane diisocyanate, 2,2'-diphenylmethane diisocyanate, prepolymers based on toluene diisocyanate and/or based on diphenylmethane diisocyanate, for example, each in combination with a photoinitiator according to the invention, are suitable in particular for curing, especially mercapto-terminated prepolymers and mercapto-terminated polymers under the influence of UV light.

The isocyanate used is especially preferably at least one diisocyanate, in particular at least one diisocyanate selected from the group consisting of 2,2'-diphenylmethane diisocyanate such as non-hydrogenated MDI, 2,4'-diphenylmethane diisocyanate such as non-hydrogenated MDI, 4,4'-diphenylmethane diisocyanate such as non-hydrogenated MDI, toluene diisocyanate TDI, fully hydrogenated MDI in particular as 4,4'-diisocyanatodicyclohexylmethane H12MDI, hexamethylene diisocyanate HDI and isophorone diisocyanate IPDI.

The molecular weight of the isocyanate used as a curing agent is preferably in the range of 120 to 8000 g/mol, especially preferably in the range of 150 to 4000 or 180 to 1500 g/mol or in the range of 240 to 500 g/mol. The molecular weight of the isocyanate-terminated prepolymer used as the curing agent is preferably in the range of 400 to 8000 g/mol, especially preferably in the range of 700 to 4000 g/mol or in the range of 1000 to 3000 g/mol.

Isocyanates based on diphenylmethane diisocyanate MDI and having a molecular weight in the range of 250 to 3000 g/mol, based on toluene diisocyanate TDI and having a molecular weight in the range of 174 to 3000 g/mol, based on hexamethylene diisocyanate HDI and having a molecular weight in the range of 168 to 3000 g/mol and/or based on isophorone diisocyanate IPDI and having a molecular weight in the range of 222 to 3000 g/mol are most especially preferred. Low-molecular and high-molecular compounds are referred to here as oligomers/polymers and/or as prepolymers.

Isocyanate-terminated prepolymers are especially preferably added to the curing agent. They have the advantage that, because of their low vapor pressure, they are a more user-friendly alternative to isocyanate in the form of monomers. It is advantageous here to use the entire desired amount of isocyanate in the form of oligomeric isocyanate-terminated prepolymers and not isocyanate monomers. In a particular embodiment, isocyanate-terminated prepolymers are used, consisting of at least 80 wt %, at least 98 wt % or at least 99.8 wt % prepolymers, with the remainder to a total of 100 wt % consisting primarily of residual monomer contents of the same isocyanate compound. With the isocyanate-terminated prepolymers, a residual monomer content of less than 20 wt %, less than 1 wt % or less than 0.1 wt % is especially preferred.

Most especially preferred are the following isocyanates:
1) Monofunctional isocyanates such as, for example, ethyl isocyanate, propyl isocyanate, cyclohexyl isocyanate, phenyl isocyanate, and/or p-toluenesulfonyl isocyanate,
2) Difunctional isocyanates such as, for example, hexamethylene diisocyanate, 2,2,4-trimethyl-hexamethylene diisocyanate, dodecamethylene diisocyanate, 1,2-cyclohexane diisocyanate, 1,4-cyclohexane diisocyanate, isophorone diisocyanate, 4-methyl-1,3-diisocyanatocyclohexane, dicyclohexylmethane-4,4'-diisocyanate, toluene diisocyanate, xylylene diisocyanate, 4,4'-diisocyanatodiphenyl, 4,4'-diisocyanatodicyclohexylmethane, 3,3'-diphenyl-4,4'-diisocyanatodiphenyl, 3,3'-dimethyl-4,4'-diisocyanatodiphenylmethane, 3,3'-dimethoxy-4,4'-diisocyanatodiphenyl, 4,4'-diphenylmethane diisocyanate, 2,4'-diphenylmethane diisocyanate and/or 2,2'-diphenylmethane diisocyanate,
3) Trifunctional isocyanates such as, for example, 1,3,5-triisocyanatobenzene, 2,4,6-triiso-cyanatotoluene and/or 1,8-diisocyanato-4-(isocyanatomethyl)octane),
4) Polyisocyanates such as, for example, the trimers of isophorone diisocyanate, uretdione dimers of 1,6-diisocyanatohexane, biurets of hexamethylene diisocyanate, allophanates of 1,6-diisocyanatohexane, hexamethylene polyisocyanate, isophorone polyisocyanate, toluene polyisocyanate and/or diphenylmethane polyisocyanate and/or
5) Isocyanate-terminated prepolymers such as, for example, adducts of hexamethylene diisocyanate with polyether polyol, polyester polyol, polyether-polyester polyol, polysulfide and/or polythioether, adducts of toluene diisocyanate with polyether polyol, polyester polyol, polyether-polyester polyol, polysulfide and/or polythioether, adducts of isophorone diisocyanate with polyether polyol, polyester polyol, polyether-polyester polyol, polysulfide and/or polythioether and/or adducts of diphenylmethane diisocyanate with polyether polyol, polyester polyol, polyether-polyester polyol, polysulfide and/or polythioether.

It may be important here in the synthesis and use of an isocyanate-terminated prepolymer that a molar excess of isocyanate in the range of 1.2 to 4 in comparison with 1 mol reactive OH and/or SH groups with respect to the total mercapto-terminated base polymer content, including the polyester polyol and/or polyether polyol optionally present, may be added as additional important reactive ingredients. This is because, to synthesize an isocyanate-terminated prepolymer, preferably at least one polyol such as, for example, a polyether, a polyester, a polysulfide and/or a polythioethers is/are preferably used.

The isocyanate may have an NCO content in the range of 1 to 40 wt % NCO, in the range of 4 to 30 wt % or 15 to 25 wt %, based on the molecular weight of the molecule, per functional group. The NCO content is in particular in the range of 1.2 to 35 or 2 to 25 wt % for the NCO groups with respect to the total molecule.

All the ingredients of the base polymer, all the isocyanate-based compounds, all the alcohols and/or all the polyols of the matrix A and the mixture B are liquid at room temperature, are highly viscous fluids and/or substances dissolved in an organic solvent. This improves the homogeneous miscibility of these constituents.

The matrix A, the mixture B and/or the sealant preferably contain(s) at least one additive selected from the group consisting of photosensitizers, fillers, lightweight fillers, thixotropy agents, plasticizers, adhesion promoters, anti-aging additives, water scavengers, flame retardants, crosslinking agents and organic solvents.

Because of the reaction(s) between isocyanate and the mercapto groups of the base polymer, a network is formed based on thiourethanes, forming the cured sealant, optionally with a polyurethane content.

This object is also achieved by a sealant system and/or a sealant comprised of an uncured matrix A based on sulfur-containing polymers, and of a curing agent containing isocyanate for production and curing of a sealant, wherein the uncured matrix A contains a mercapto-terminated base polymer based on polyether, polythioether, polysulfide, their copolymers and/or mixtures thereof, wherein the uncured matrix A, the curing agent or both contain a photoinitiator which can be activated on exposure to high-energy actinic radiation and can release an amine radical which acts or can act as a catalyst for the curing process after an amine compound has formed, and wherein the mixture of matrix A and curing agent, which together form mixture B, may cure upon exposure to high-energy actinic radiation, release of an amine radical and/or formation of an amine compound and is referred to as a sealant as soon as it begins to cure. The sealant system refers to the system of uncured matrix A, curing agent, mixture B and sealant. The compositions, the properties, the methods and effects of the sealant system are therefore the same as those with the uncured matrix A, as with the curing agent, as with mixture B and as with the sealant. Therefore they will not be described again.

This object is also achieved by an uncured matrix A based on sulfur-containing polymers to produce a sealant—prepared in particular for curing on demand—this sealant being characterized in that the uncured matrix A contains a mercapto-terminated base polymer which is based on polyether, polythioether, polysulfide, copolymers and/or mixtures of same as well as a photoinitiator, and that the photoinitiator is activated by exposure to high-energy actinic radiation to form a tertiary amine compound as the catalyst after release of an amine radical, which tertiary amine compound catalyzes the reaction between mercapto-terminated base polymer and isocyanate-based hardener.

The uncured mixture B prepared for curing on demand is characterized in that it is a mixture of an uncured matrix A and a curing agent that contains isocyanate, that the mixture B contains a photoinitiator which can be activated on exposure to high-energy actinic radiation and can release an amine radical which acts as a catalyst for the curing reaction after forming an amine compound, and that mixture B cures upon exposure to high-energy actinic radiation, release of an amine radical and formation of an amine compound. Curing of mixture B is greatly accelerated on exposure to high-energy actinic radiation. As soon as the curing process begins, mixture B is then referred to as a sealant.

This object is also achieved by a curing agent for preparing a sealant based on sulfur-containing polymers, characterized in that the curing agent contains an isocyanate plus at least one photoinitiator, and that at least one photoinitiator can be activated on exposure to high-energy actinic radiation and can release and/or form an amine, which may and/or does act as a catalyst for curing a mercapto-terminated base polymer with an isocyanate-containing curing agent.

With the sealant system according to the invention, the mixture B according to the invention and/or the sealant according to the invention, the curing of the uncured mixture B is initiated and/or accelerated by irradiation with a high-energy actinic radiation.

This object is also achieved with a curing agent which contains sulfur-containing prepolymers with a backbone based on 1) polythioether, 2) polysulfide, 3) copolymers containing an amount of polythioether and/or an amount of polysulfide and/or 4) mixtures thereof, wherein these prepolymers are isocyanate-terminated.

In one special embodiment, the curing agent contains sulfur-containing prepolymers with a polymer backbone based on 1) polythioether, 2) polysulfide, 3) copolymers containing an amount of polythioether and/or an amount of polysulfide and/or 4) mixtures thereof, wherein these prepolymers are isocyanate-terminated. These isocyanate-terminated prepolymers especially preferably have a residual monomer content of isocyanate of less than 3%, less than 1 wt % or less than 0.1 wt %.

A curing agent that contains sulfur-containing prepolymers with a polymer backbone based on 1) hydroxy-terminated and/or mercapto-terminated polythioether, 2) hydroxy-terminated and/or mercapto-terminated polysulfide, 3) copolymers containing an amount of hydroxy-terminated and/or mercapto-terminated polythioether and/or an amount of hydroxy-terminated and/or mercapto-terminated polysulfide and/or 4) mixtures thereof is especially preferred, wherein these prepolymers are isocyanate-terminated and wherein these sulfur-based isocyanate-terminated prepolymers have a residual isocyanate monomer content of less than 3 wt %, less than 1 wt % or less than 0.1 wt %. It is especially difficult to produce curing agents with such a low residual monomer content because isocyanate-terminated prepolymers having polyester and/or polyether backbone with a residual monomer content of less than 1 wt % or less than 0.1 wt % are very complex to produce because they also require a distillation step to remove the residual monomer from the prepolymer. Furthermore, as far as the present applicant is aware, there are no known isocyanate-terminated prepolymers with a polysulfide and/or polythioether backbone and a residual monomer content of less than 1 wt % or less than 0.1 wt %.

In a particular preferred method, a curing agent containing sulfur-based prepolymer with a polymer backbone based on 1) polythioether, 2) polysulfide, 3) copolymers containing an amount of polythioether and/or an amount of polysulfide and/or 4) mixtures thereof is used, wherein these prepolymers are isocyanate-terminated.

This object is also achieved by an aircraft that contains components coated and/or sealed using a sealant system and/or a sealant according to the invention and/or a method according to the invention.

The Matrices a and/or B According to the Invention as Well as the Sealant May Additionally Contain in Each Case at Least One of the Following Additives as Needed:

A photoinitiator based on a hindered tertiary amine, which is able to release a radical of an unhindered tertiary amine.

Furthermore, mixtures of photosensitizers and/or photoinitiators may advantageously be used to adjust the absorption wavelength(s) of the sealant in a specific manner. The photosensitizer can shift the absorption edge and/or the absorption range of the chemical system.

A filler based in particular on magnesium silicate hydrate such as, for example, talc, based on aluminum hydroxide such as, for example, $Al(OH)_3$, based on a feldspar, based on quartz powder and/or based on a calcium silicate and/or aluminum silicate, especially preferably at least one filler with a particle size primarily in the range of 1 to 20 μm. Adding one or more fillers serves to improve the mechanical properties. Fillers suitable for UV radiation have proven to include calcium silicate, magnesium silicate hydrate, aluminum silicate, quartz powder and/or aluminum hydroxide such as, for example, aluminum trihydrate. Fillers based on $CaCO_3$, $TiO_2$, carbon black and/or $BaSO_4$ as well as fillers with a significant Fe content and/or containing additional heavy metals have proven to be less suitable for the matrices and sealants according to the invention.

Lightweight fillers, in particular those based on polyurethane including their copolymers, polyamide wax and/or polyolefin wax are also used. Lightweight fillers are also used to reduce the density. Alternatively or additionally, hollow filing bodies may also be used.

Thixotropy agents, in particular based on feldspar, silicic acid/silica, sepiolite and/or bentonite: thixotropy agents are used to adjust the rheological properties, in particular for thixotropic behavior, to be able to apply a mixture B in a stable manner.

Plasticizers, in particular based on an adipate, a benzoate, a citrate, a phthalate and/or a terphenyls: plasticizers are used to increase the flexibility of the sealant.

Adhesion promoters, in particular those based on a phenolic resin, a resol and/or a silane/silanol/siloxane—referred to here simply as "silane"—e.g., those based on organofunctional alkoxysilane, such as, for example, mercaptopropyltrimethoxysilane, mercaptopropyltriethoxysilane, glycidoxypropyltrimethoxysialne, glycidoxypropyltriethoxysilane, methacryloxymethyltrimethoxysilane and/or (methacryloxymethyl)methyldimethoxysilane and/or a bis-silylsilane: Such adhesion promoters are used to improve the adhesion between the sealant and the substrate.

Anti-aging agents are used in particular based on sterically hindered phenol, phenyleneamine and/or as so-called hindered amine light stabilizers such as light stabilizers based on sterically hindered amines HALS, for example, 4,6-bis(dodecylthiomethyl)-o-cresol, ethylene-bis(oxyethylene)bis(3-(5-tert-butyl-4-hydroxy-m-tolyl)propionate, thiodiethylene-bis[3-(3,5-di-tert-butyl-4-hydroxyphenyl)propionate], pentaerythritol tetrakis(3-(3,5-di-tert-butyl-4-hydroxyphenyl)-propionate) and/or phenylene amines such as, for example, N-isopropyl-N'-phenyl-p-phenylenediamine. Antiaging agents are used to scavenge the free radicals formed due to aging processes involving the polymer matrix and/or other cleavage products, and they contribute toward delaying and/or preventing aging such as yellowing or embrittlement of the sealant.

Water scavengers, in particular based on an organofunctional alkoxysilane, based on a zeolite such as an alkali aluminum zeolite and/or based on a monofunctional isocyanate are used, wherein said monofunctional isocyanate first binds the water chemically but cannot act as a curing agent. Water scavengers are used to scavenge the water present in the raw materials.

Crosslinking agents, in particular based on alcohol and/or polyol, which preferably help to further improve the mechanical properties.

Flame retardants, in particular those based on phosphate esters, based on ammonium polyphosphate, based on melamine, based on aluminum hydroxide and/or based on magnesium hydroxide: the flame retardants are used to improve the fire prevention behavior of the sealant such as, for example, to delay the onset of burning of the sealant, to spontaneously terminate the burning process and/or to reduce the formation of smoke.

And/or at least one organic solvent, in particular based on an ester and/or an ether such as, for example, ethyl acetate and/or monopropylene glycol monomethyl ether can optionally simplify the homogenization of the liquid or highly viscous mixture.

The Composition of Matrix A According to the Invention Preferably Contains the Following:

A base polymer containing at least one mercapto-terminated polymer/copolymer and/or one mercapto-terminated polythioether in an amount in the range of 30 to 98 wt %, preferably in the range from 40 to 95 wt %, from 45 to 90 wt %, from 50 to 85 wt %, from 55 to 80 wt % or in the range of 60 to 75 wt %, optionally including a monomer and/or oligomer content of 0 or in the range of 0.001 to 20 wt %, which may constitute 0 or 0.001 to 10 wt % of the base polymer.

Optionally at least one plasticizer in a total amount of 0 wt % or in the range from 0.1 to 30 wt %, from 2 to 20 wt %, from 5 to 15 wt % or from 6 to 10 wt %.

Optionally at least one filler with a total amount of 0 wt % or in the range from 0.1 to 50 wt %, from 2 to 40 wt %, from 5 to 30 wt %, from 10 to 20 wt % or from 6 to 15 wt %;

Optionally at least one lightweight filler in a total amount of 0 wt % or in the range from 0.1 to 30 wt %, from 3 to 25 wt %, from 5 to 20 wt % or from 8 to 15 wt %;

Optionally at least one thixotropy agent in a total amount of 0 wt % or in the range from 0.01 to 30 wt %, from 0.01 to 10 wt %, from 0.2 to 25 wt %, from 0.5 to 20 wt %, from 1 to 15 wt %, from 0.5 to 8 wt % or from 1.5 to 5 wt %, wherein even larger amounts than 10 wt % are principally also possible, in particular when the thixotropy agent is used as a filler at the same time and is sufficiently permeable for the high-energy actinic radiation, but in this case it is counted only with the thixotropy agents with regard to its amount;

Optionally at least one photoinitiator which can release a free radical based on tertiary amine, in a total amount of 0 wt % or in the range from 0.05 to 5 wt %, from 0.1 to 4 wt %, from 0.3 to 3 wt % or from 0.6 to 2 wt %;

Optionally at least one photosensitizer which can shift the absorption spectrum of the sealant formulation, in a total amount of 0 wt % or in the range from 0.05 to 5 wt %, from 0.1 to 4 wt %, from 0.3 to 3 wt % or from 0.6 to 2 wt %;

Optionally at least one adhesion promoter in a total amount of 0 wt % or in the range from 0.1 to 10 wt %, from 0.3 to 8 wt %, from 0.6 to 6 wt %, from 1 to 5 wt %, from 2 to 4 wt % or from 1.5 to 3 wt %;

Optionally at least one water scavenger in a total amount of 0 wt % or in the range from 0.5 to 2.5 wt % or from 0.5 to 1.5 wt %;

Optionally at least one antiaging agent in a total amount of 0 wt % or in the range from 0.5 to 2.5 wt % or from 0.5 to 1.5 wt %;

Optionally at least one flame retardant in a total amount of 0 wt % or in the range from 0.5 to 40 wt % or from 0.5 to 10 wt %;

Optionally at least one crosslinking agent in particular based on alcohol and/or polyol, which preferably helps to further improve the mechanical properties, in a total amount of 0 wt % or in the range from 0.1 to 10 wt % or from 0.5 to 6 wt %;

And optionally at least one organic solvent based on an ester and/or ether in a total amount of 0 wt % or in the range from 0.1 to 15 wt % or from 2 to 10 wt %.

A homogeneous mixture of matrix A can be achieved, for example, by using a vacuum dissolver.

The Curing Agent According to the Invention Preferably Contains:

At least one isocyanate in a total amount in the range from 20 to 100, from 30 to 98, from 40 to 95, from 50 to 90 wt %, from 60 to 85 or from 70 to 80 wt %. The isocyanate here preferably has an NCO content in the range from 1 to 55 wt % NCO, in the range from 4 to 40 wt % or from 15 to 25 wt %;

Optionally at least one photoinitiator, which may release a free radical based on tertiary amine, in a total amount of 0 wt % or in the range of 1 to 90 wt %, in the range of 2 to 50 wt % or in the range of 3 to 20 wt %;

Optionally at least one photosensitizer in a total amount of 0 wt % or in the range of 1 to 90 wt % or in the range of 2 to 50 wt % or in the range of 3 to 20 wt %;

Optionally at least one thixotropy agent in a total amount of 0 wt % or in the range from 0.01 to 10 wt % or from 0.5 to 5 wt %. Furthermore, it may be advantageous if the curing agent also contains a thixotropy agent based on pyrogenic silica, for example, because this has proven to be a particularly good agent for adjusting the flow properties of the curing agent.

Optionally at least one crosslinking agent, based in particular on alcohol and/or polyol which preferably helps to further improve the mechanical properties, in a total amount of 0 wt % or in the range from 0.1 to 10 wt % or from 0.5 to 6 wt %;

And optionally at least one organic solvent based on an ester and/or ether, in a total amount of 0 wt % or in the range of from 0.1 to 15 wt % or from 2 to 10 wt %.

A homogeneous mixture of the curing agent can be achieved in particular by using a vacuum dissolver.

The Composition of Mixture B According to the Invention and/or the Sealant Produced Therefrom Preferably Contains the Following:

At least one base polymer in an amount in the range of from 20 to 97 wt % before the crosslinking reaction with the isocyanate-based curing agent, preferably in the range from 40 to 95 wt %, from 45 to 90 wt %, from 50 to 85 wt %, from 55 to 80 wt % or in the range of 60 to 75 wt % of at least one mercapto-terminated polymer and/or a mercapto-terminated polythioether.

At least one base polymer in an amount in the range of 20 to 97 wt % after the crosslinking reaction with the isocyanate-based hardener, preferably in the range from 40 to 95 wt %, from 45 to 90 wt %, from 50 to 85 wt %, from 55 to 80 wt % or in the range of 60 to 75 wt % which is a polymer/copolymer based on thiourethane after the crosslinking reaction with isocyanate, wherein a polymer/copolymer based on polyurethane may also be present in a small amount and/or may be bound into the network from the crosslinking reaction with at least one polyol.

At least one photoinitiator capable of releasing a free radical based on tertiary amine, in a total amount of 0 wt % or in the range from 0.05 to 5 wt %, from 0.1 to 4 wt %, from 0.3 to 3 wt % or from 0.6 to 2 wt % and/or the radicals and/or the compounds formed from them a short period of time thereafter in a total amount of 0 wt % or in the range from 0.05 to 5 wt %, from 0.1 to 4 wt %, from 0.3 to 3 wt % or from 0.6 to 2 wt %;

Optionally at least one photosensitizer in a total amount of 0 wt % or in the range from 0.05 to 5 wt %, from 0.1 to 4 wt %, from 0.3 to 3 wt % or from 0.6 to 2 wt %;

At least one isocyanate in a total amount in the range from 20 to 100, from 30 to 98, from 40 to 95, from 50 to 90 wt %, from 60 to 85 or from 70 to 80 wt %.

Optionally at least one filler in a total amount of 0 wt % or in the range from 0.1 to 50 wt %, from 2 to 40 wt %, from 5 to 30 wt %, from 10 to 20 wt % or from 6 to 15 wt %;

Optionally at least one lightweight filler in a total amount of 0 wt % or in the range from 0.1 to 30 wt %, from 3 to 25 wt %, from 5 to 20 wt % or from 8 to 15 wt %;

Optionally at least one thixotropy agent in a total amount of 0 wt % or in the range from 0.01 to 30 wt %, from 0.01 to 10 wt %, from 0.2 to 25 wt %, from 0.5 to 20 wt %, from 1 to 15 wt %, from 0.5 to 8 wt % or from 1.5 to 5 wt %, whereby larger amounts than 10 wt % are also possible in principle, in particular if the thixotropy agent is used as a filler at the same time and is sufficiently permeable for the high-energy actinic radiation, whereby in this case it is counted only as a thixotropy agent with respect its amount;

Optionally at least one plasticizer in a total amount of 0 wt % or in the range from 0.1 to 30 wt %, from 2 to 20 wt %, from 5 to 15 wt % or from 6 to 10 wt %;

Optionally at least one adhesion promoter in a total amount of 0 wt % or in the range from 0.1 to 10 wt %, from 0.3 to 8 wt %, from 0.6 to 6 wt %, from 1 to 5 wt %, from 2 to 4 wt % or from 1.5 to 3 wt %;

Optionally at least one water scavenger in a total amount of 0 wt % or in the range from 0.5 to 2.5 wt % or from 0.5 to 1.5 wt %;

Optionally at least one anti-aging agent in a total amount of 0 wt % or in the range from 0.5 to 2.5 wt % or from 0.5 to 1.5 wt %;

And optionally at least one organic solvent based on an ester and/or ether in a total amount of 0 wt % or in the range from 0.1 to 15 wt % or from 2 to 10 wt %.

A homogeneous mixture of mixture B can be obtained, for example, by using a Techkit cartridge mixer or a static mixer ("side by side" or as a "bulk mixer").

The weight ratio of mercapto-terminated base polymer to isocyanate-based compounds in the curing agent is preferably in the range of 100:3 to 100:50, particularly preferably in the range from 100:4 to 100:25, from 100:5 to 100:15 or from 100:6 to 100:12, without taking into account the amounts of other compounds of the respective compositions.

The weight ratio of the partial mixture(s) of the matrix A to the isocyanate-based curing agent is preferably in the range of from 100:3 to 100:30, particularly preferably in the range of from 100:4 to 100:25, from 100:5 to 100:15 or from 100:6 to 100:12, including taking into account the amounts of additional compounds of the respective compositions.

The molecular weight ratio of the partial mixture(s) of the matrix A to the isocyanate-based curing agent is preferably in the range of from 0.6:1 to 5:1, particularly preferably in the range of from 0.8:1 to 4:1, from 0.9:1 to 3:1 or from 1:1 to 2:1, including taking into account the amounts of additional compounds of the respective compositions.

The weight ratio of mercapto-terminated base polymer to photoinitiator is preferably in the range of from 100:0.1 to 100:5, particularly preferably in the range of from 100:0.5 to 100:4, from 100:0.8 to 100:3 or from 100:1 to 100:2 without taking into account additional amounts of the respective compounds.

The molecular weight ratio of mercapto groups to isocyanate groups is preferably in the range of from 1:0.8 to 1:2, particularly preferably in the range of from 1:0.9 to 1:1.5, from 1:0.95 to 1:1.3 or from 1:0.98 to 1:1.2 without taking into account additional amounts and groups of the respective compounds.

The mixture B according to the invention, the sealant according to the invention and the sealant system according to the invention preferably have a mercapto-terminated base polymer based on polyether, polythioether, polysulfide, copolymers and/or mixtures thereof, at least one photoinitiator based on sterically hindered tertiary amine and at least one isocyanate plus optionally at least one additive. The at least one additive may preferably be at least one selected from the group consisting of photosensitizers, fillers, lightweight fillers, thixotropy agents, plasticizers, adhesion mediators, anti-aging agents, water scavengers, flame retardants, crosslinking agents and organic solvents. The filler is preferably magnesium silicate hydrate, aluminum silicate, aluminum hydroxide such as, for example, aluminum trihydrate and/or calcium silicate. A portion of these main components and optionally also a portion of these additives may also be contained in the matrix A and/or in the curing agent.

The Matrices According to the Invention Preferably have the Following Properties:

The matrices, mixtures B and sealants according to the invention usually have most if not all of the properties listed below.

The dynamic viscosity of the matrix A and mixture B according to the invention is preferably between 1 and 2500 Pa·s or between 10 and 1800 Pa·s, determined according to DIN 65262-1, measured with a Brookfield viscometer at 23° C. using spindle 7 at 2 to 10 rpm.

The UV radiation is preferably performed over a period of time from 1 s to 5 min, preferably from 5 s to 3 min or from 10 s to 1 min, depending on the layer thickness and/or the UV source. The tack-free time of the sealant, determined according to DIN 65262-1, is preferably in the range of 1 s to 5 min, in particular depending on the layer thickness, and is often in the range of 0.3 to 3 min or 1 to 2 min starting from the beginning of UV radiation.

The processing time of the mixtures B and sealants according to the invention, determined according to DIN 65262-1, is preferably in the range of 0.5 to 24 hours, especially preferably in the range of 1 to 6 or 1 to 2 hours, depending on the amount of photoinitiator in the matrix to be irradiated, among other things.

The uncured mixture B is characterized in particular in that it has a processing time corresponding to DIN 65262-1 in the range of 0.5 to 12 hours, in particular depending on the photoinitiator concentration.

A sealant prepared by the method according to the invention preferably has a tack-free time in the range of 0.05 to 5 minutes after the start of high-energy actinic radiation according to DIN 65262-1, also depending in particular on the photoinitiator concentration.

The complete curing time or the time until reaching a Shore hardness of 30, determined according to ISO 7619, is preferably in the range of 1 to 960 min, especially in the range of 5 to 300 min, especially preferably in the range of 10 to 60 min with the sealants according to the invention, depending on the amount of photoinitiator and/or the layer thickness, among other things.

The density of the matrices according to the invention, mixtures B and sealants, determined according to ISO 2781, is preferably in the range of 0.9 to 1.6 g/cm$^3$ and often in the range of 1.2 to 1.5 g/cm$^3$.

The sealants according to the invention preferably have a Shore A hardness, determined according to ISO 7619 and measured 2 weeks after UV radiation in storage in air at 23±2° C. and 50±5% relative atmospheric humidity, in the range of 20 to 80, especially preferably in the range of 30 to 60, especially preferably in the range of 40 to 55.

The elongation at break of the sealants according to the invention, determined according to ISO 37 and measured 2 weeks after UV radiation during storage in air at 23±2° C. and 50±5% relative atmospheric humidity is preferably in the range of 100 to 1000%, especially preferably in the range of 200% to 800% or 300% to 600%.

The elongation at break of the sealants according to the invention, determined according to ISO 37 and measured after 168 hours in storage in a fuel at 60° C., using the jet Al type of fuel, is preferably in the range of 100 to 800%, especially preferably in the range of 200 to 600% or 300 to 500%.

The elongation at break of the sealants according to the invention, determined according to ISO 37 and measured after 300 hours in storage in fuel at 100° C., using the jet Al type of fuel is preferably in the range of 100 to 700%, especially preferably in the range of 200 to 600% or 400 to 500%.

The elongation at break of the sealants according to the invention, determined according to ISO 37 and measured after 1000 hours in storage in water at 35° C. is preferably in the range from 100 to 700%, especially preferably in the range from 200 to 500% or 250 to 350%.

The peel resistance of the sealants according to the invention on aluminum alloy 2024 T3, determined according to DIN 65262-1, is preferably in the range of 60 to 350 N/25 mm, especially preferably in the range of 100 to 250 N/25 mm or 160 to 200 N/25 mm.

The peel resistance of sealants according to the invention on enamels, such as, for example, on base enamels containing solvent such as, for example, epoxy base enamel 37035 A from Akzo Nobel Aerospace Coatings, on water-based base enamels such as, for example, those based on epoxy such as Seevenax® 313-01 and Seevenax® 313-02 from Mankiewicz, on cover enamels such as, for example, water-based top coats based on epoxies such as Seevenax® 313-01 from Mankiewicz, on finish F 70-A from Mapaero and/or on solvent-containing top coats based on polyurethanes such as Aerodur® 21-100 from Akzo Nobel and Alexit® 406-22 from Mankiewicz, determined according to DIN 65262-1 is preferably in the range of 50 to 350 N/25 mm, especially preferably in the range from 10 to 300 N/25 mm or from 170 to 210 N/25 mm.

The tensile strength of the sealants according to the invention, determined according to ISO 37 and measured after 2 weeks after UV irradiation with storage in air at 23±2° C. and 50±5% relative atmospheric humidity is preferably in the range of 0.5 to 3.5 MPa, especially preferably in the range of 1 to 3 MPa or 1.8 to 2.7 MPa.

The tensile strength of the sealants according to the invention determined according to ISO 37 and measured after 168 hours at 60° C. in storage in fuel of jet Al type is in the range of 0.5 to 3 MPa, especially preferably in the range of 1 to 2.5 or 1.5 to 2 MPa.

The tensile strength of the sealants according to the invention determined according to ISO 37 and measured after 300 hours at 100° C. in storage in fuel of jet Al type is preferably in the range of 0.5 to 3 MPa, especially preferably in the range of 1 to 2 or 0.8 to 1.1 MPa.

The tensile strength of the sealants according to the invention determined according to ISO 37 and measured after 1000 hours at 35° C. in storage in water is preferably in the range of 0.5 to 3 MPa, especially preferably in the range of 1 to 2 MPa or 1.5 to 1.7 MPa.

The sealant system according to the invention and/or the sealant according to the invention preferably have a Shore A hardness of at least 10, measured 5 to 600 minutes after high-energy actinic radiation, and a Shore A hardness in the range of 30 to 60, measured 2 weeks after high-energy actinic radiation.

And/or the cold flexibility of the sealants according to the invention for the determination of which the sealant, in particular in the form of a film after high-energy actinic radiation is stored for 2 weeks at an ambient temperature of 23±2° C. and 50±5% relative atmospheric humidity, then is cooled briefly to a temperature of −55±2° C., bent at an angle of 30° at this low temperature and then inspected visually for the occurrence of defects at room temperature in accordance with an in-house inspection procedure. According to this, the sealants according to the invention preferably do not have any cracks or any defects caused by bending at a low temperature.

The sealant system according to the invention and/or the sealant according to the invention preferably have the following properties after complete curing:
  no cracks or other defects in the sealant that have occurred in determination of the low temperature flexibility due to bending at an angle of 30° at a temperature of −55±2°,
  a tensile strength in the range of 0.5 to 2.8 MPa after 168 hours of storage in a fuel at a temperature of 60° C., after 300 hours of storage in a fuel at a temperature of 100° C. and after 1000 hours of storage in water at a temperature of 35° C.,
  an elongation at break in the range of 100 to 800% after 168 hours of storage in fuel at a temperature of 60° C., after 300 hours of storage in a fuel at a temperature of 100° C. and after 1000 hours of storage in water at a temperature of 35° C. and/or
  a density in the range of 1.00 to 1.45 g/cm$^3$.

The sealant system according to the invention and/or the sealant according to the invention preferably has/have the following properties after complete curing:
  a tensile strength in the range of 0.5 to 3 MPa,
  an elongation at break in the range of 100 to 900% and/or
  a peel resistance in the range of 50 to 300 N/25 mm.

The peel resistance here is determined in particular on substrates of aluminum or aluminum alloys, of titanium or titanium alloys, of stainless steels, of composite materials such as, for example, carbon fiber-reinforced plastic CFP and/or on enamel substrates that have been enameled, for example, with at least one solvent-containing or water-based base coat and/or top coat, in particular based on epoxy, polyester or polyurethane enamel.

Additional Surprising Effects and Advantages:

The photoinitiators that release tertiary amine surprisingly also trigger and/or accelerate the chemical reaction of isocyanates with mercaptans with high-energy actinic radiation, for example, when the mixture according to the invention is exposed to UV light.

It was surprising that a photoinitiator that releases only small quantities of tertiary amine radical would supply sufficient amounts of catalytic activity for the curing of matrices.

It was surprising that in many cases such a small amount of photoinitiator as 0.1 wt %, for example, in mixture B is already sufficient for a catalytic activation even in concealed locations, undercut locations and boreholes.

It was surprising that the sealant system discovered here would permit both curing of layer thicknesses up to approx. 7 mm as well as accelerated curing up to approximately this layer thickness.

It has surprisingly been found that MDI-based isocyanates in particular have an especially efficient effect.

Such sealants that undergo surface curing especially rapidly and remain processable for a long period of time are evidently described for the first time here.

Such rapidly surface-curing sealants that can even be processed on demand are evidently also described here for the first time.

Extremely short tack-free times and also extremely short complete curing times in comparison with the prior art are surprisingly achieved with the given processing times.

It has surprisingly been found that the sealants according to the invention often need only very small UV doses for the start of curing, i.e., with a UV dose starting at approx. 500 mJ/cm$^2$.

With the method according to the invention, especially thin layers of sealant of 0.1 to 0.5 µm, for example, and also especially thick layers of 3 to 7 mm can be cured with UV light with the method according to the invention so that a range of approx. 0.1 to 7 mm can be cured. The sealants may be applied over a surface area or even in the form of beading.

The coating method according to the invention is suitable in particular for the aviation industry, but may also be used wherever a rapid and complete curing and especially a very rapid surface curing with a relatively long sealant processing time are necessary and/or advantageous.

The coating method according to the invention is suitable in particular for sealing construction elements such as, for example, tanks and areas that are to be sealed such as plastering as in gas stations and chemical installations, for example, for connecting structural elements placed on top of one another such as sheet metal, films and other substrates, for filling cavities and intermediate spaces, for coating metallic materials in particular and composites such as, for example, carbon fiber reinforced or glass fiber reinforced plastics, for aerodynamic smoothing and compaction as well as for preventing corrosion in locations where the anticorrosion layers of the metallic elements have been damaged or removed, for example, in the area of boreholes. A load-bearing function may also be fulfilled, for example, during shipping.

The methods according to the invention are suitable in particular for use in the shipping industry such as, for example, in automotive engineering, in the construction of rail vehicles, in shipbuilding, in the airplane construction industry or in the spacecraft construction industry, in machine and equipment construction, in the building industry or for the production of furniture.

The sealant system according to the invention, the matrix A according to the invention, the curing agent according to the invention, the mixture B according to the invention and/or the sealant according to the invention are suitable in particular for use in construction and for service and maintenance of aviation and space vehicles, automobiles and rail vehicle, shipbuilding, equipment and machine building, in the construction industry, e.g., for sealing base plates in gas stations, for example, and chemical plants as well as for casting resin or for the production of casting resins for the electronics and the electrical industries.

EXAMPLES AND COMPARATIVE EXAMPLES

The subject matter of the invention is explained in greater detail below on the basis of exemplary embodiments.

General production and test procedure for the sealants according to the invention:

The matrix A according to the invention was prepared by first mixing polysulfide polymers such as Thiokol® LP 12, Thioplast® G 10 and/or Thioplast® G131, molecular sieve material based on the Purmol 3ST zeolite, at least one photoinitiator based on α-aminoketones, at least one photosensitizer such as, for example, benzophenone and/or isopropyl thioxanthone, a thixotropy agent, e.g., based on sepiolite and an adhesion promoter, e.g., based on a phenolic resin or based on organofunctional alkoxysilane for 10 minutes in vacuo at <50 mbar or even <10 mbar and with cooling of a planetary dissolver with cooling water at a rotational speed of approx. 2000 rpm. Next the remaining fillers, e.g., based on magnesium silicate hydrates, aluminum silicates, calcium silicates, polyamides and/or polyethylene waxes and an anti-aging agent, e.g., based on phosphorous acid ester were added and dispersed for an additional 10 to 20 minutes in vacuo at <50 mbar or even <10 mbar by means of a planetary dissolver at a rotational speed of approx. 2000 rpm. The polysulfides, polythioethers, and copolymers thereof that were used were always mercapto-terminated.

For good dispersion of the matrix, the rotational speed ranges of 500 to 2200 rpm and times of 10 to 60 minutes in particular, depending on the composition, rheological properties and equipment are suitable in particular.

The curing agent according to the invention (partial mixture II) was prepared by mixing the monomeric diphenylmethane diisocyanate, the polyisocyanate and/or the isocyanate-terminated prepolymer with the thixotropy agent based on pyrogenic silica Aerosil® R202 in vacuo at <50 mbar or even <10 mbar by means of a planetary dissolver at a rotational speed of approx. 2000 rpm. The information about the molecular weights is approximate values.

For compacting, filling and/or coating construction parts and for producing test bodies, the partial mixtures I and II were combined in a mixing ratio of 100:6, for example, and then activated with high-energy actinic radiation. The sealants according to the invention will cured even without high-energy actinic radiation, but then a time in the range of 24 to 168 hours would be necessary for thorough curing, depending on the layer thicknesses in the range of 0.2 to 6 mm.

The mechanical properties of the sealants such as the Shore A hardness were determined according to ISO 7619, tensile strength and elongation at break were determined according to ISO 37, peel resistance was determined according to DIN 65262-1, after the sealant had been stored for 14 days in air at an ambient air temperature of 23° C. and 50% relative atmospheric humidity. In these tests, after initial mixing of the matrix A with the hardener in air, the mixture B was immediately applied to a substrate and irradiated with high-energy actinic radiation immediately thereafter. From then on, the mixture was stored in air. After the air storage, the mixture would then be stored in various other media (see Tables 5, 7, 10, 12 and 14).

For activation of the sealant, a UV area lamp with a Fe-doped Hg lamp with a power of 400 W was generally used. All the commercially available UV light sources including UV light-emitting diodes and fluorescent lamps or electron beam sources are suitable for curing the actinically activatable coatings. The sealants which are applied in great layer thicknesses, in particular with layers 1 to 6 mm thick can preferably be cured at a wavelength in the range of 315 to 600 nm, such as UVA and/or UVVIS, while the sealants which are applied in smaller layer thicknesses, in particular 0.1 to 1 mm, will preferably cure better at a wavelength in the range of 100 to 315 nm, such as that of UVC and/or UVB.

In UV activation of the sealant, the UV parameters listed in Table 3 were measured. Complete curing and a quick tack-free time of the sealant were achieved at high UV doses of the UV radiation by means of an Fe-doped Hg emitter as well as at low UV doses of the UV radiation by means of a UV LED lamp.

TABLE 3

UV parameters for activation of the sealant and their effects.

| UV parameter/UV lamp | | 400 W Fe surface lamp | 200 W Ga spot lamp | 100 W UV LED lamp |
|---|---|---|---|---|
| UV dose (mJ/cm$^2$) | UV total | 6098 | 1037 | 520 |
| | UVVIS | 1965 | 497 | 250 |
| | UVA | 3256 | 540 | 270 |
| | UVB | 868 | 0 | 0 |
| | UVC | 9 | 0 | 0 |
| UV intensity (mW/cm$^2$) | UV total | 235 | 41 | 23 |
| | UVVIS | 75 | 23 | 14 |
| | UVA | 125 | 18 | 9 |
| | UVB | 35 | 0 | 0 |
| | UVC | 0 | 0 | 0 |

Distance from lamp 10 cm, irradiation time 30 s, layer thickness 2 mm*
*Approximate data for the present patent application The recipes for the examples according to the invention that are listed in Table 4 were prepared to determine the influence of the amount of photoinitiator on the processing properties of the matrix A, the mixture B and the curing sealant on the mechanical properties of the sealant. The matrices A according to the invention as partial mixtures I and the curing agent compositions as partial mixtures II were prepared according to the procedure given above as in all other examples and comparative examples. The two partial mixtures were mixed homogeneously in a weight ratio of 100:6, for example, then applied in a layer thickness of 2 mm to sheet metal of an aluminum alloy by extrusion from a mixer cartridge at approx. 23° C. and then irradiated using an Fe-doped UV surface lamp at wavelengths in the range of 300 to 600 nm at a UV dose of approx. 6000 mJ/cm$^2$ and at a UV intensity of 200 mW/cm$^2$ at a distance of 10 cm for 30 s. In doing so, the curing coating experienced a slight heating, without reaching 60° C.

Then the fully cured sealants were removed from the test molds and stored in air at a relative atmospheric humidity of 50±5% at 23±2° C. for 2 weeks before the mechanical properties such as elongation, peel resistance and tensile strength were determined.

The photoinitiator 1 used was 2-dimethylamino-2-(4-methylbenzyl)-1-(4-morpholin-4-ylphenyl)-butan-1-one. The photoinitiator 2 was 2-benzyl-2-dimethylamino-1-(4-morpholinophenyl)butan-1-one. The photoinitiator 3 was 2-methyl-1-[4-(methylthio)phenyl]-2-morpholinopropan-1-one. While the photoinitiator 4 has a base of α-hydroxy ketone, the photoinitiator 5 is based on phosphine oxide and the photoinitiator 6 is based on methylbenzoyl formate. Mercaptopropyltrimethoxysilane was added to the adhesion promoter 2 to function as the adhesion promoter, and (methacryloxymethyl)methyldimethoxysilane was added as the adhesion promoter 3. Hollow microspheres based on vinylidene chloride-acrylonitrile copolymers were used as the lightweight filler 4. An isocyanate-terminated prepolymer based on HDI, MDI or TDI with a molecular weight of approx. 500 to 3000 g/mol was used as the isocyanate-terminated prepolymer—see Examples B12, B21, B24 and B26. The MDI-terminated prepolymer of B12 had a backbone of polysulfide and a residual monomer content of MDI approximately in the range of 0.8 and 5 wt %. The sealants of the comparative examples VB are commercially available and were acquired in a premixed form but not yet cured with high-energy actinic radiation. The main ranges of the molecular weights are given as the data on the polysulfides. The compositions in the Comparative Examples VB1 to VB3 do not contain any photoinitiator additives or any curing agent based on isocyanate.

TABLE 4

Composition of the masses of Examples B1 to B5 and the Comparative Examples VB1 to VB3.

| Content in wt %/Example — Comp. Ex. | B1 | B2 | B3 | B4 | B5 | VB1 | VB2 | VB3 |
|---|---|---|---|---|---|---|---|---|
| Partial mixture I = matrix A | | | | | | | | |
| Matrix Naftoseal ® MC-...* | | | | | | 100 MC-780 B-½ | 100 MC-238 B-¼ | 100 MC-780 C-60 |
| Long-chain polysulfide (3900-4400 g/mol) | 71.5 | 70.8 | 70.4 | 69.6 | 70.4 | | | |
| Photoinitiator 1 | 0.1 | 0.8 | 1.2 | 2.0 | | | | |
| Photoinitiator 2 | | | | | 1.2 | | | |
| Photosensitizer 1: benzophenone | 1.0 | 1.0 | 1.0 | 1.0 | | | | |
| Photosensitizer 2: isopropyl thioxanthone | | | | | 1.0 | | | |
| Filler aluminum silicate | 20.0 | 20.0 | 20.0 | 20.0 | 20.0 | | | |
| Adhesion promoter: phenolic resin | 1.0 | 1.0 | 1.0 | 1.0 | 1.0 | | | |
| Thixotropy agent: sepiolite | 3.0 | 3.0 | 3.0 | 3.0 | 3.0 | | | |
| Water scavenger: NaAl-based zeolite | 1.0 | 1.0 | 1.0 | 1.0 | 1.0 | | | |
| Antiaging agent: phosphorous acid ester | 2.4 | 2.4 | 2.4 | 2.4 | 2.4 | | | |
| Total | 100 | 100 | 100 | 100 | 100 | 100 | 100 | 100 |

TABLE 4-continued

Composition of the masses of Examples B1 to B5 and the Comparative Examples VB1 to VB3.

| Content in wt %/Example — Comp. Ex. | B1 | B2 | B3 | B4 | B5 | VB1 | VB2 | VB3 |
|---|---|---|---|---|---|---|---|---|
| Partial mixture II = curing agent | | | | | | | | |
| Monomeric isocyanate based on MDI of 335 g/mol | 95 | 95 | 95 | 95 | 95 | | | |
| Thixotropy agent pyrogenic silica | 5 | 5 | 5 | 5 | 5 | | | |
| Naftoseal ® MC-... curing agent* | | | | | | 100 MC-780 B-½ | 100 MC-238 A-½ | 100 MC-780 C-60 |
| Total | 100 | 100 | 100 | 100 | 100 | 100 | 100 | 100 |
| Mixing ratio of matrix A:curing agent | 100:6 | 100:6 | 100:6 | 100:6 | 100:6 | 100:10 | 100:12 | 100:10 |

*Products of Chemetall GmbH

TABLE 5

Curing and properties of the sealants of Examples B1 to B5 and of Comparative Examples VB1 to VB3; RT = room temperature.

| Properties, Example — Comparative Example | B1 | B2 | B3 | B4 | B5 | VB1 | VB2 | VB3 |
|---|---|---|---|---|---|---|---|---|
| Density (g/cm$^3$) | 1.42 | 1.41 | 1.43 | 1.43 | 1.42 | 1.1 | 1.5 | 1.35 |
| Processing time (min) | 1440 | 180 | 60 | 30 | 60 | 30 | 15 | 3,600 |
| Tack-free time (min) | 2 | 2 | 2 | 2 | 2 | 240 | 50-120 | 60,000 |
| Complete curing time for initial hardness of Shore A 30 (min) | 720 | 60 | 40 | 20 | 40 | 480 | 90-240 | 86,400-100,800 |
| Shore A hardness after 14 days at RT | 45 | 44 | 43 | 45 | 44 | 50 | 60 | 50 |
| Tensile strength (MPa) after 14 days at RT | 1.90 | 2.10 | 2.52 | 2.65 | 2.45 | 1.5-2.2 | 2.2 | 1.5-2.2 |
| Elongation (%) after 14 days at RT | 266 | 300 | 400 | 466 | 388 | 300-400 | 430 | 300-400 |
| Peel (N/25 mm) after 14 days at RT | 1.25 | 168 | 184 | 193 | 189 | 120-150 | 180 | 120-150 |
| Tensile strength (MPa) after 168 h at 60° C. storage in fuel | 1.23 | 1.54 | 2.20 | 2.31 | 2.26 | 1.5-2.0 | 1.8-2.0 | 1.5-2.0 |
| Elongation (%) after 168 h at 60° C. storage in fuel | 285 | 332 | 440 | 487 | 467 | 300-400 | 270-300 | 300-400 |
| Tensile strength (MPa) after 300 h at 100° C. storage in fuel | 0.41 | 0.46 | 0.95 | 1.02 | 0.93 | 1.5-2.0 | 1.8-2.0 | 1.5-2 |
| Elongation (%) after 300 h at 100° C. storage in fuel | 750 | 732 | 467 | 496 | 453 | 300-400 | 270-400 | 300-400 |
| Tensile strength (MPa) after 1000 h at 35° C. storage in H$_2$O | 1.10 | 1.75 | 2.10 | 2.31 | 2.15 | 1.0-1.5 | 1.8-2.0 | 1.0-1.2 |
| Elongation (%) after 1000 h at 35° C. storage in H$_2$O | 230 | 287 | 303 | 315 | 310 | 300-400 | 400-500 | 300-350 |
| Change in volume (%) according to DIN EN ISO 10563 | −1.8 | −1.9 | −2.0 | −2.1 | −2.0 | −3.0 | −3.8 | −5.4 |

It has surprisingly been found that the photoinitiators based on α-aminoketones, which are otherwise conventionally used for free radical curing of acrylates and methacrylates lead to polyaddition between the sulfur-containing polymer/copolymer of the partial mixture I and the hardener based on isocyanate of partial mixture II and thereby result in curing of the sealant on demand after UV radiation. Furthermore, within a few seconds or at the latest within 2 minutes after UV radiation, a tack-free layer was formed directly on the sealant surface, with the tack-free layer rapidly advancing to greater depths and becoming thicker. Surface curing was possible very rapidly in this way, and an accelerated complete curing, i.e., the time until reaching a Shore A hardness of 30, was possible "on demand," while the processing time of the matrices B according to the invention was just as long as or much longer than the processing time of a conventional fast-curing sealant (VB1 to VB3).

It was surprising that the amount of photoinitiator had no influence on the tack-free time, but instead had an influence only on the complete curing time which can evidently be explained by the fact that the UV radiation on the sealant surface contributes more to the formation of free tertiary amine at the surface than in a deeper layer and thus smaller amounts of photoinitiator are also sufficient to form a tack-free layer.

By varying the photoinitiator concentration, the processing time of the matrix according to the invention can be controlled well, and the complete curing time increases in proportion to a longer processing time.

The sealant according to the invention has surprisingly exhibit good mechanical properties even after storage in various media and at an elevated temperature such as, for example, storage in water at 35° C. or storage in fuel at 60° C. or 100° C.

An increase in the photoinitiator concentration leads to improved tensile strength values and elongation values at room temperature as well as after storage in various media.

The choice of photosensitizer had no influence on the processing properties or on the mechanical properties of the sealant according to the invention.

The compositions of the primers according to the invention listed in Table 6 were prepared to determine the influence of the chain length of the polysulfide polymers, the influence of the adhesion promoter and the influence of the different curing agents on the processing properties and on the mechanical properties. The matrices according to the invention as partial mixtures I, the curing agent compositions as partial mixtures II and the compositions of the comparative examples were prepared according to the procedure given above. The two partial mixtures were applied in a layer thickness of 2 mm to a test body and then irradiated with a Fe-doped UV surface emitter at wavelengths in the range of 300 to 600 nm for 30 s at a distance of 10 cm.

The use of polyisocyanates based on MDI/HDI trimers, HDI biurets and isophorone diisocyanates as well as MDI-terminated prepolymers as curing agent has also proven suitable for UV curing, wherein the isocyanate-terminated prepolymer surprisingly led to an even faster complete curing of the sealant according to the invention. In this way, sealants with a layer thickness of 2 mm were completely cured within 10 to 600 minutes after UV radiation, while the

TABLE 6

Makeup of the compositions of Examples B6 to B12 and Comparative Examples VB4 to VB5. The comparative examples VB4 and VB were not cured with isocyanate but instead with curing agents based on a different chemical composition. Despite the irradiation with UV light, these comparative examples do not fully cure until after several weeks.

| Content in wt %, Example — Comparative Example | B6 | B7 | B8 | B9 | B10 | B11 | B12 | VB4 | VB5 |
|---|---|---|---|---|---|---|---|---|---|
| Partial mixture I = matrix A | | | | | | | | | |
| Long-chain polysulfide (5000-6500 g/mol) | | 70.4 | | | | | | | |
| Long-chain polysulfide (3900-4400 g/mol) | | | 58 | 70.4 | 70.4 | 70.4 | 70.4 | 70.4 | 70.4 |
| Medium-chain polysulfide (2400-3100 g/mol) | 70.4 | | | | | | | | |
| Shod-chain polysulfide (<1100 g/mol) | | | 12.4 | | | | | | |
| Photoinitiator 1 | 1.2 | 1.2 | 1.2 | 1.2 | 1.2 | 1.2 | 1.2 | 1.2 | 1.2 |
| Photosensitizer 1: benzophenone | 1.0 | 1.0 | 1.0 | 1.0 | 1.0 | 1.0 | 1.0 | 1.0 | 1.0 |
| Adhesion promoter 1: phenolic resin | 1.0 | 1.0 | 1.0 | | | 1.0 | 1.0 | 1.0 | 1.0 |
| Adhesion promoter 2 and/or 3 | | | | 2:1.0 | 3:1.0 | | | | |
| Filler: aluminum silicate | 20.0 | 20.0 | 20.0 | 20.0 | 20.0 | 20.0 | 20.0 | 20.0 | 20.0 |
| Thixotropy agent: sepiolite | 3.0 | 3.0 | 3.0 | 3.0 | 3.0 | 3.0 | 3.0 | 3.0 | 3.0 |
| Water scavenger: NaAl-based zeolite | 1.0 | 1.0 | 1.0 | 1.0 | 1.0 | 1.0 | 1.0 | 1.0 | 1.0 |
| Antiaging agent: phosphorous acid ester | 2.4 | 2.4 | 2.4 | 2.4 | 2.4 | 2.4 | 2.4 | 2.4 | 2.4 |
| Total | 100 | 100 | 100 | 100 | 100 | 100 | 100 | 100 | 100 |
| Partial mixture II = hardener | | | | | | | | | |
| Monomeric isocyanate based on MDI 335 g/mol | 95 | 95 | 95 | 95 | 95 | | | | |
| Polyisocyanate 1 = based on MDI 800 g/mol | | | | | | 100 | | | |
| MDI-terminated prepolymer of 2000 g/mol | | | | | | | 100 | | |
| Thixotropy agent: pyrogenic silica | 5 | 5 | 5 | 5 | 5 | | | | |
| Epoxy resin E and/or organic peroxide P | | | | | | | | 100 E | 100 P |
| Total | 100 | 100 | 100 | 100 | 100 | 100 | 100 | 100 | 100 |
| Mixing ratio of matrix A:hardener | 100:6 | 100:6 | 100:6 | 100:6 | 100:6 | 100:16 | 100:20 | 100:7.8 | 100:4.5 |

TABLE 7

Curing and properties of the sealants of Examples B6-B12 and Comparative Examples VB3-VB4; not determined = n.d.

| Properties, Example — Comparative Example | B6 | B7 | B8 | B9 | B10 | B11 | B12 | VB4 | VB5 |
|---|---|---|---|---|---|---|---|---|---|
| Density (g/cm$^3$) | 1.42 | 1.42 | 1.42 | 1.42 | 1.42 | 1.42 | 1.42 | 1.42 | 1.42 |
| Processing time (min) | 60 | 100 | 50 | 180 | 70 | 480 | 60 | >24 | >24 |
| Tack-free time (min) | 2 | 2 | 2 | 2 | 2 | 2 | 1 | 180 | >7200 |
| Complete curing time for initial hardness of Shore A 30 (min) | 40 | 50 | 30 | 120 | 40 | 240 | 15 | >14,400 | >14,400 |
| Shore A hardness after 14 days at RT | 45 | 38 | 45 | 32 | 43 | 35 | 50 | <10 | <10 |
| Tensile strength (MPa) after 14 days at RT | 1.4 | 2.2 | 1.2 | 1.12 | 1.94 | 1.2 | 2.2 | <0.2 | <0.2 |
| Elongation (%) after 14 days at RT | 216 | 450 | 198 | 830 | 456 | 420 | 220 | <100 | <100 |
| Peel (N/25 mm) after 14 days at RT | 88 | 170 | 69 | 93 | 167 | 56 | 175 | <10 | <10 |
| Tensile strength (MPa) after 168 h at 60° C. storage in fuel | 1.13 | 1.64 | 0.80 | 0.70 | 1.64 | 0.82 | 1.91 | <0.2 | <0.2 |
| Elongation (%) after 168 h at 60° C. storage in fuel | 247 | 476 | 256 | 870 | 473 | 497 | 235 | <100 | <100 |
| Tensile strength (MPa) after 300 h at 100° C. storage in fuel | 0.53 | 0.64 | 0.35 | n.d. | 0.73 | 0.56 | 1.13 | <0.2 | <0.2 |
| Elongation (%) after 300 h at 100° C. storage in fuel | 430 | 647 | 178 | n.d. | 515 | 570 | 303 | <100 | <100 |
| Tensile strength (MPa) after 1000 h at 35° C. storage in H$_2$O | 1.05 | 1.27 | 0.75 | 0.61 | 1.55 | 0.75 | 1.83 | <0.2 | <0.2 |
| Elongation (%) after 1000 h at 35° C. storage in H$_2$O | 218 | 357 | 212 | 892 | 560 | 436 | 255 | <100 | <100 |

Use of polymer/prepolymers of definitely different chain lengths led to different mechanical properties but had no effect on the tack-free time.

processing time was kept at a minimum of 60 minutes. The tack-free time was still reached within 1 to 2 minutes after UV radiation. Furthermore, the sealant also exhibited excellent mechanical properties with and without storage in various media at elevated temperature.

Comparative examples in which a commercially available epoxy resin and a commercially available peroxide were used as the curing agents were not suitable for UV curing of the sealant because complete curing of less than 60 minutes for a 2 mm thickness to be irradiated could not be observed and it was also impossible to achieve a tack-free surface rapidly, for example, in less than 10 min, when the thickness of the sealant to be irradiated was 2 mm.

With the experimental series presented in Table 8, the speed of different UV curing sealants was tested at various layer thicknesses (2 and 5 mm).

TABLE 8

Processing properties of a few recipes with different layer thicknesses.

| Properties/Example | B4 | | B6 | | B12 | |
|---|---|---|---|---|---|---|
| Layer thickness (mm) | 2 | 5 | 2 | 5 | 2 | 5 |
| Processing time (min) | 60 | 60 | 60 | 60 | 70 | 70 |

TABLE 8-continued

Processing properties of a few recipes with different layer thicknesses.

| Properties/Example | B4 | | B6 | | B12 | |
|---|---|---|---|---|---|---|
| Tack-free time (min) | 2 | 2 | 2 | 2 | 2 | 2 |
| Complete curing time for initial hardness of Shore A 30 (min) | 40 | 300 | 40 | 360 | 15 | 60 |

When using an isocyanate-terminated prepolymer as the curing agent (see B12), an extremely fast complete curing was surprisingly achieved in 60 minutes even with a layer thickness of the molded sealant of 5 mm, for example, while there was no influence on the tack-free time.

The matrices according to the invention as listed in Table 9 were prepared according to the procedure given above and cured with UV light. The effects of the fillers, the lightweight fillers and the very large amounts of photoinitiator or photosensitizer on the mechanical properties and on the processing times were determined.

TABLE 9

Makeup of the compositions of Examples B13 to B17 as well as the Comparative Examples VB6 to VB8.

| Content in wt %, Example — Comp. Example | B13 | B14 | B15 | B16 | B17 | VB6 | VB7 | VB8 |
|---|---|---|---|---|---|---|---|---|
| Partial mixture I = matrix A | | | | | | | | |
| Long-chain polysulfide (3900-4400 g/mol) | 70.4 | 70.4 | 70.4 | 70.4 | 70.4 | 57.6 | 41.6 | 51.4 |
| Photoinitiator 1 | 1.2 | 1.2 | 1.2 | 1.2 | 1.2 | 10 | 30 | 1.2 |
| Photosensitizer 1: benzophenone | 1.0 | 1.0 | 1.0 | 1.0 | 1.0 | 1.0 | 1.0 | 20 |
| Filler 1: magnesium silicate hydrates | 20.0 | | | | | | | |
| Filler 2: aluminum hydroxides | | 20.0 | 12.0 | 12.0 | 8.0 | 20 | 20.0 | 20.0 |
| Lightweight filler 1: polyamide | | | 8.0 | | 12.0 | | | |
| Lightweight filler 2: polyethylene | | | | 8.0 | | | | |
| Adhesion promoter: phenolic resin | 1.0 | 1.0 | 1.0 | 1.0 | 1.0 | 1.0 | 1.0 | 1.0 |
| Thixotropy agent: sepiolite | 3.0 | 3.0 | 3.0 | 3.0 | 3.0 | 3.0 | 3.0 | 3.0 |
| Water scavenger: NaAl-based zeolite | 1.0 | 1.0 | 1.0 | 1.0 | 1.0 | 1.0 | 1.0 | 1.0 |
| Antiaging agent: phosphorous acid ester | 2.4 | 2.4 | 2.4 | 2.4 | 2.4 | 2.4 | 2.4 | 2.4 |
| Total | 100 | 100 | 100 | 100 | 100 | 100 | 100 | 100 |
| Partial mixture II = curing agent | | | | | | | | |
| Monomeric isocyanate MDI of 335 g/mol | 95.0 | 95.0 | 95.0 | 95.0 | 95.0 | 95.0 | 95.0 | 95.0 |
| Thixotropy agent: pyrogenic silica | 5.0 | 5.0 | 5.0 | 5.0 | 5.0 | 5.0 | 5.0 | 5.0 |
| Total | 100.0 | 100.0 | 100.0 | 100.0 | 100.0 | 100.0 | 100.0 | 100.0 |
| Mixing ratio matrix A:curing agent | 100:6 | 100:6 | 100:6 | 100:6 | 100:6 | 100:6 | 100:6 | 100:6 |

TABLE 10

Curing and properties of the sealants of Examples B13 to B17 and Comparative Examples VB5 to VB7

| Properties, Example — Comparative Example | B13 | B14 | B15 | B16 | B17 | VB6 | VB7 | VB8 |
|---|---|---|---|---|---|---|---|---|
| Density (g/cm$^3$) | 1.41 | 1.42 | 1.38 | 1.39 | 1.29 | 1.43 | 1.08 | 1.27 |
| Processing time (min) | 60 | 60 | 760 | 90 | 100 | 20 | 10 | 40 |
| Tack-free time (min) | 2 | 2 | 2 | 2 | 2 | 2 | 2 | 2 |
| Complete curing time for initial hardness of Shore A 30 (min) | 40 | 50 | 50 | 60 | 70 | 48 | 56 | 90 |
| Shore A hardness after 14 days at RT | 46 | 42 | 41 | 38 | 37 | 35 | 32 | 33 |
| Tensile strength (MPa) after 14 days at RT | 2.3 | 2.05 | 1.84 | 1.92 | 1.45 | 0.6 | 0.4 | 1.6 |
| Elongation (%) after 14 days at RT | 443 | 560 | 578 | 610 | 430 | 900 | 1000 | 1500 |
| Peel (N/25 mm) after 14 days at RT | 150 | 110 | 101 | 105 | 135 | <20 | <20 | <20 |
| Tensile strength (MPa) after 168 h at 60° C. storage in fuel | 1.82 | 1.71 | 1.63 | 1.73 | 0.92 | <0.2 | <0.2 | <0.2 |
| Elongation (%) after 168 h at 60° C. storage in fuel | 610 | 580 | 605 | 623 | 442 | 650 | 690 | 800 |

TABLE 10-continued

Curing and properties of the sealants of Examples B13 to B17 and Comparative Examples VB5 to VB7

| Properties, Example — Comparative Example | B13 | B14 | B15 | B16 | B17 | VB6 | VB7 | VB8 |
|---|---|---|---|---|---|---|---|---|
| Tensile strength (MPa) after 300 h at 100° C. storage in fuel | 0.87 | 0.67 | 0.41 | 0.54 | 0.77 | <0.2 | <0.2 | <0.2 |
| Elongation (%) after 300 h at 100° C. storage in fuel | 6.22 | 830 | 880 | 780 | 463 | 500 | 450 | 600 |
| Tensile strength (MPa) after 1000 h at 35° C. storage in H$_2$O | 1.94 | 1.73 | 1.41 | 1.65 | 0.88 | <0.2 | <0.2 | <0.2 |
| Elongation (%) after 1000 h at 35° C. storage in H$_2$O | 565 | 557 | 720 | 605 | 295 | 450 | 530 | 620 |

Examples B13 to B17 show that certain fillers such as aluminum hydroxides, polyamide, and polyethylene lead to good results with respect to processing properties and mechanical properties.

A reduction in the density of the sealant to values of less than 1.3 g/cm³ as in B17 surprisingly had no negative on rapid surface curing "on demand" or on the subsequent rapid complete curing. Furthermore, the sealants had very good mechanical properties, with or without storage in various media at elevated temperatures. Addition of very large amounts of photoinitiator or photosensitizer yielded very soft and incompletely cured sealants (see VB6 to VB8).

TABLE 11

Makeup of the compositions of examples B18 to B26, wherein the isocyanate in B21 has a backbone based on polysulfide and a residual TDI monomer content of less than 0.24 wt %, while the isocyanate of B24 has a backbone based on polythioether and also has a residual TDI monomer content of less than 0.1 wt %, The isocyanate of B26 has a backbone based on polysulfide and a residual MDI monomer content of less than 1 wt %.

| Content in wt %/example — comparative example | B18 | B19 | B20 | B21 | B22 | B23 | B24 | B25 | B26 |
|---|---|---|---|---|---|---|---|---|---|
| Partial mixture I = matrix A | | | | | | | | | |
| Long-chain polysulfide (3900-4400 g/mol) | 70.4 | 70.4 | 70.4 | 70.4 | 70.4 | 70.4 | 70.4 | 55.4 | 70.4 |
| Photoinitiator 1 + photosensitizer 1: benzophenone | | | | | | | | 1.2 + 1.0 | |
| Filler 2: aluminum hydroxides | 22.2 | 22.2 | 22.2 | 22.2 | 22.2 | 22.2 | 22.2 | 20.0 | 22.2 |
| Flame retardant based on phosphate ester | | | | | | | | 15.0 | |
| Adhesion promoter phenolic resin | 1.0 | 1.0 | 1.0 | 1.0 | 1.0 | 1.0 | 1.0 | 1.0 | 1.0 |
| Thixotropy agent: sepiolite | 3.0 | 3.0 | 3.0 | 3.0 | 3.0 | 3.0 | 3.0 | 3.0 | 3.0 |
| Water scavenger: NaAl-based zeolite | 1.0 | 1.0 | 1.0 | 1.0 | 1.0 | 1.0 | 1.0 | 1.0 | 1.0 |
| Antiaging agent B: phosphorous acid ester | 2.4 | 2.4 | 2.4 | 2.4 | 2.4 | 2.4 | 2.4 | 2.4 | 2.4 |
| Total | 100 | 100 | 100 | 100 | 100 | 100 | 100 | 100 | 100 |
| Partial mixture II = curing agent | | | | | | | | | |
| Monomeric isocyanate based on MDI of 335 g/mol | 72.0 | 72.0 | | | | | | 95.0 | |
| Monomeric isocyanate based on TDI of 175 g/mol | | | 72.0 | | | | | | |
| Isocyanate prepolymer based on TDI of 1900 g/mol | | | | 77.0 | | | | | |
| Monomeric isocyanate based on HDI of 170 g/mol | | | | | 72.0 | | | | |
| Isocyanate trimer based on HDI of 360 g/mol | | | | | | 72.0 | | | |
| Isocyanate prepolymer based on TDI of 3000 g/mol | | | | | | | 77.0 | | |
| Isocyanate prepolymer based on MDI of 2500 g/mol | | | | | | | | | 77.0 |
| Thixotropy agent: pyrogenic silica | 5.0 | 5.0 | 5.0 | | 5.0 | 5.0 | | 5.0 | |
| Photoinitiator 1 | 13.0 | 13.0 | 13.0 | 13.0 | 13.0 | 13.0 | 13.0 | | 13.0 |
| Photosensitizer 1: benzophenone | 10.0 | 10.0 | 10.0 | 10.0 | 10.0 | 10.0 | 10.0 | | 10.0 |
| Total | 100.0 | 100.0 | 100.0 | 100.0 | 100.0 | 100.0 | 100.0 | 100.0 | 100.0 |
| Mixing ratio of matrix A:curing agent | 100:9 | 100:9 | 100:5 | 100:56 | 100:5 | 100:11 | 100:83 | 100:5 | 100:60 |

TABLE 12

Curing and properties of the sealants of examples B18 to B26.

| Properties/example — comparative example | B18 | B19 | B20 | B21 | B22 | B23 | B24 | B25 | B26 |
|---|---|---|---|---|---|---|---|---|---|
| Density (g/cm³) | 1.39 | 1.30 | 1.40 | 1.40 | 1.39 | 1.41 | 1.41 | 1.42 | 1.39 |
| Processing time (min) | 80 | 160 | 300 | 800 | 1000 | 1000 | 1200 | 80 | 500 |
| Tack-free time (min) | 2 | 2 | 2 | 2 | 2 | 2 | 2 | 2 | 2 |
| Complete curing time for initial hardness of Shore A 30 (min) | 60 | 90 | 180 | 300 | 500 | 600 | 700 | 45 | 180 |
| Shore A hardness after 14 days at RT | 45 | 45 | 40 | 45 | 30 | 33 | 50 | 40 | 46 |
| Tensile strength (MPa) after 14 days at RT | 2.1 | 2.3 | 2.0 | 1.6 | 1.3 | 1.4 | 2.7 | 1.7 | 2.5 |
| Elongation (%) after 14 days at RT | 540 | 420 | 620 | 340 | 440 | 450 | 410 | 630 | 400 |
| Peel (N/25 mm) after 14 days at RT | 115 | 140 | 100 | 150 | 80 | 85 | 146 | 120 | 138 |
| Tensile strength (MPa) after 168 h at 60° C. storage in fuel | 1.8 | 1.7 | 1.4 | 1.3 | 1.1 | 1.0 | 1.1 | 1.5 | 1.8 |

TABLE 12-continued

Curing and properties of the sealants of examples B18 to B26.

| Properties/example — comparative example | B18 | B19 | B20 | B21 | B22 | B23 | B24 | B25 | B26 |
|---|---|---|---|---|---|---|---|---|---|
| Elongation (%) after 168 h at 60° C. storage in fuel | 570 | 530 | 430 | 320 | 300 | 250 | 200 | 450 | 320 |
| Tensile strength (MPa) after 300 h at 100° C. storage in fuel | 0.8 | 0.7 | 0.5 | 0.8 | 0.4 | 0.5 | 0.9 | 0.6 | 1.0 |
| Elongation (%) after 300 h at 100° C. storage in fuel | 790 | 400 | 490 | 280 | 200 | 250 | 230 | 230 | 410 |
| Tensile strength (MPa) after 1000 h at 35° C. storage in $H_2O$ | 1.69 | 1.2 | 1.3 | 0.8 | 0.7 | 0.6 | 0.9 | 0.9 | 1.3 |
| Elongation (%) after 1000 h at 35° C. storage in $H_2O$ | 545 | 300 | 330 | 220 | 230 | 270 | 200 | 200 | 270 |

In the case of Example B18, a composition and a method were selected according to B14 in which the corresponding amounts were selected in a similar manner, but in this method the photoinitiator 1 was added to the curing agent instead of being added to the matrix A. This also resulted in good properties in example B18.

The sealants of Examples B20 to B24 and B26 were prepared according to the general production and test procedure, cured with UV light and tested. The influence of different isocyanate ethers such as toluene diisocyanate, hexamethylene diisocyanate and their prepolymers and/or trimers on the processing properties and on the mechanical properties were determined.

Examples B25 and B31 show, that the addition of liquid flame retardants based on phosphate esters or phosphonate surprisingly leads to results comparable to those obtained with the sealants according to the invention, as was the case with the other sealants according to the invention, and even permitted a particularly rapid curing. Liquid flame retardant based on phosphate esters or phosphonate is capable of partially replacing the mercapto-terminated base polymer and is particularly suitable as an additive in the range of 0.1 to 30 wt %. For example, polyphosphates, tris-(2-ethylhexyl) phosphate, triethyl phosphates, triaryl phosphates, triaryl polyphosphates and dimethylpropane phosphonate are especially suitable here. This yields a fire prevention behavior that is significantly improved.

The matrices presented in Table 13 were prepared according to the aforementioned procedure and then cured with UV light, thereby releasing prepolymers having different basic structures and molecular weights (see B27 to B29); and various photoinitiators that do not release tertiary amines (see VB9 to VB11) were tested with respect to their mechanical properties and the processing properties of the sealants.

TABLE 13

Makeup of the compositions of Examples B27 to B31 and Comparative Examples VB9 to VB11.

| Content in wt %, Example — Comparative Example | B27 | B28 | B29 | B30 | B31 | VB9 | VB10 | VB11 |
|---|---|---|---|---|---|---|---|---|
| Partial mixture I = matrix A | | | | | | | | |
| Polythioether (3900-4100 g/mol) | 70.4 | | | 70.4 | 57.6 | 70.4 | 70.4 | 70.4 |
| Polythioether (2000-2200 g/mol) | | 70.4 | | | | | | |
| Polythioether-polysulfide (1800-2000 g/mol) | | | 70.4 | | | | | |
| Photoinitiator no. | 1:1.2 | 1:1.2 | 1:1.2 | 3:1.2 | | 4:1.2 | 5:1.2 | 6:1.2 |
| Photosensitizer based on benzophenone | 1 | 1 | 1 | 1 | | 1 | 1 | 1 |
| Flame retardant based on phosphate ester | | | | | 15.0 | | | |
| Filler: aluminum silicate | 22.2 | 22.2 | 22.2 | 22.2 | 20.0 | 22.2 | 22.2 | 22.2 |
| Adhesion promoter phenolic resin | 1.0 | 1.0 | 1.0 | 1.0 | 1.0 | 1.0 | 1.0 | 1.0 |
| Thixotropy agent: sepiolite | 3.0 | 3.0 | 3.0 | 3.0 | 3.0 | 3.0 | 3.0 | 3.0 |
| Water scavenger: NaAl-based zeolite | 1.0 | 1.0 | 1.0 | 1.0 | 1.0 | 1.0 | 1.0 | 1.0 |
| Antiaging agent B: phosphorous acid ester | 2.4 | 2.4 | 2.4 | 2.4 | 2.4 | 2.4 | 2.4 | 2.4 |
| Total | 100 | 100 | 100 | 100 | 100 | 100 | 100 | 100 |
| Partial mixture II = curing agent | | | | | | | | |
| Monomeric isocyanate based on MDI of 335 g/mol | 95.0 | 95.0 | 95.0 | 95.0 | 72.0 | 95.0 | 95.0 | 95.0 |
| Photoinitiator 1 | | | | | 13.0 | | | |
| Photosensitizer based on benzophenone | | | | | 10.0 | | | |
| Thixotropy agent: pyrogenic silica | 5.0 | 5.0 | 5.0 | 5.0 | 5.0 | 5.0 | 5.0 | 5.0 |
| Total | 100 | 100 | 100 | 100 | 100 | 100 | 100 | 100 |
| Mixing ratio of matrix A:curing agent | 100:6 | 100:9 | 100:5 | 100:6 | 100:9 | 100:6 | 100:6 | 100:6 |

TABLE 14

Curing and properties of the sealants of Examples B27-B31 and Comparative Examples VB9-VB11.

| Properties, Example — Comparative Example | B27 | B28 | B29 | B30 | B31 | VB9 | VB10 | VB11 |
|---|---|---|---|---|---|---|---|---|
| Density (g/cm³) | 1.31 | 1.31 | 1.34 | 1.31 | 1.35 | 1.31 | 1.31 | 1.31 |
| Processing time (min) | 120 | 110 | 115 | 120 | 90 | >1440 | >1440 | >1440 |
| Tack-free time (min) | 2 | 2 | 2 | 2 | 2 | >1440 | >1440 | >1440 |
| Complete curing time for initial hardness of Shore A 30 (min) | 80 | 70 | 60 | 90 | 45 | >14,400 | >14,400 | >14,400 |
| Shore A hardness after 14 days at RT | 48 | 52 | 55 | 47 | 42 | <1 | <1 | <1 |
| Tensile strength (MPa) after 14 days at RT | 2.0 | 2.2 | 2.3 | 2.0 | 1.6 | <0.1 | <0.1 | <0.1 |
| Elongation (%) after 14 days at RT | 350 | 250 | 200 | 300 | 640 | <1 | <1 | <1 |
| Peel (N/25 mm) after 14 days at RT | 180 | 175 | 160 | 190 | 130 | <1 | <1 | <1 |
| Tensile strength (MPa) after 168 h at 60° C. storage in fuel | 1.7 | 2.0 | 2.0 | 1.8 | 1.5 | <1 | <1 | <1 |
| Elongation (%) after 168 h at 60° C. storage in fuel | 220 | 200 | 170 | 220 | 440 | <1 | <1 | <1 |
| Tensile strength (MPa) after 300 h at 100° C. storage in fuel | 1.3 | 1.2 | 1.4 | 1.2 | 0.7 | <1 | <1 | <1 |
| Elongation (%) after 300 h at 100° C. storage in fuel | 250 | 230 | 240 | 260 | 450 | <1 | <1 | <1 |
| Tensile strength (MPa) after 1000 h at 35° C. storage in H₂O | 1.0 | 0.9 | 1.1 | 1.0 | 1.2 | <1 | <1 | <1 |
| Elongation (%) after 1000 h at 35° C. storage in H₂O | 280 | 240 | 260 | 290 | 369 | 1 | 1 | 1 |

The photoinitiators 4 to 6 are suitable specifically for acrylate-based polymer systems but not for the mercapto-terminated base polymers according to the present patent application (see VB9 to VB11). They do not release any radicals based on tertiary amine and are therefore unsuitable for use according to the present invention.

In addition to the speed record for the extremely rapid curing of high quality sealants, there is also a record in terms of properties which is associated with the extraordinary reduction in the so-called shrinkage in curing.

With conventional aviation sealants based on mercapto-terminated polymers, the shrinkage in volume of the cured sealant with respect to the volume of the original mixture B is usually −4 to −9 vol % at the start of curing. In the case of the sealants according to the present patent application, however, shrinkage is usually only −1 to −2.5 vol %. The lower shrinkage here seems to be associated with the lack of plasticizer content and with the type of crosslinking. In comparison with that, the (meth)acrylate-based sealants, however, even have a volume shrinkage in the range of approximately −8 to −15 vol %. To determine the shrinkage of the sealant, the volume change method according to DIN EN ISO 10563 is used.

Curing agents based on manganese dioxide always require a plasticizer content of approx. 5 to 10 wt % relative to the total sealant composition. These plasticizers often result in a volume shrinkage of approx. −2 to −10%. These plasticizers can escape into the environment and may be washed out especially at an elevated temperature.

Another advantageous property relates to the stability of the sealants during storage in water. Water storage of a conventionally cured sealant for more than 1000 hours at 35° C., for example, typically has a marked influence on the mechanical properties of a sealant cured with manganese dioxide (see VB1 and VB2), while the mechanical properties of the sealants according to the invention show a much smaller decline.

On the whole, the high quality properties of the conventional aviation sealants such as the high resistance to various media such as a fuel resistance at 60° C., for example, measured after 168 hours and 100° C., for example, a water resistance at 35° C., measured after 1000 hours, hydraulic fluid, water of condensation and deicing fluid, a high temperature stability, high cold flexibility, high weather resistance, high peel resistance on different substrates, high elongation at break and high tensile strength have been achieved here to a large extent or to the full extent, despite the extreme shortening of the curing time.

The invention claimed is:

1. A sealant formed from a mixture B comprising
an uncured matrix A based on sulfur-containing polymers, wherein the sulfur-containing polymers are mercapto-terminated base polymers based on polyether, polythioether, polysulfide, copolymers thereof, and/or mixtures thereof, wherein the mercapto-terminated polymer has a mercaptan content, based on the reactive SH groups to the total weight of the polymer, in the range of 0.8 to 8 wt %; and
a curing agent containing isocyanate, the isocyanate having an average functionality in the range of 1.5 to 3.2;
wherein the uncured matrix A, the curing agent or both contain a photoinitiator, which includes an α-aminoketone, which is activated by exposure to high-energy actinic radiation and releases an amine radical;
wherein the sealant is free of (meth)acrylate-based compounds/polymers; and
wherein the sealant is formed when curing of mixture B starts.

2. An uncured matrix A based on sulfur-containing polymers, wherein the uncured matrix A contains
a mercapto-terminated base polymer based on polyether, polythioether, polysulfide, copolymers thereof and/or mixtures thereof, wherein the mercapto-terminated polymer has a mercaptan content, based on the reactive SH groups to the total weight of the polymer, in the range of 0.8 to 8 wt %, and
a photoinitiator, which includes an α-aminoketone, that is activated on exposure to high-energy actinic radiation to form a tertiary amine compound as a catalyst after releasing an amine radical, which tertiary amine compound catalyzes a reaction between the mercapto-terminated base polymer and the isocyanate-based curing agent;

wherein the matrix A is free of (meth)acrylate-based compounds/polymers.

3. An uncured mixture B, which is a mixture of
an uncured matrix A based on sulfur-containing polymers, wherein the sulfur-containing polymers are mercapto-terminated base polymers based on polyether, polythioether, polysulfide, copolymers thereof, and/or mixtures thereof, wherein the mercapto-terminated polymer has a mercaptan content, based on the reactive SH groups to the total weight of the polymer, in the range of 0.8 to 8 wt %,
a curing agent containing isocyanate, the isocyanate having an average functionality in the range of 1.5 to 3.2, and
a photoinitiator, which includes an α-aminoketone, that is activated by exposure to high-energy actinic radiation and releases an amine radical, which forms an amine compound;
wherein the mixture B is free of (meth)acrylate-based compounds/polymers.

4. A sealant according to claim 1, based on at least one mercapto-terminated polysulfide polymer.

5. An uncured matrix A based on sulfur-containing polymers for production of a sealant according to claim 2, comprising at least one mercapto-terminated polysulfide polymer.

6. An uncured mixture B according to claim 3, based on at least one mercapto-terminated polysulfide polymer.

7. A sealant according to claim 1, wherein the sealant contains at least one additive selected from the group consisting of photosensitizers, fillers, lightweight fillers, thixotropy agents, plasticizers, adhesion promoters, antiaging agents, water scavengers, flame retardants, crosslinking agents and organic solvents.

8. An uncured matrix A based on sulfur-containing polymers for production of a sealant according to claim 2, wherein the matrix A contains at least one additive selected from the group consisting of photosensitizers, fillers, lightweight fillers, thixotropy agents, plasticizers, adhesion promoters, antiaging agents, water scavengers, flame retardants, crosslinking agents and organic solvents.

9. An uncured mixture B according to claim 3, wherein the matrix A and/or the mixture B contain(s) at least one additive selected from the group consisting of photosensitizers, fillers, lightweight fillers, thixotropy agents, plasticizers, adhesion promoters, antiaging agents, water scavengers, flame retardants, crosslinking agents and organic solvents.

10. A sealant according to claim 1, wherein it contains a filler which is magnesium silicate hydrate, aluminum silicate, aluminum hydroxide and/or calcium silicate.

11. An uncured matrix A based on sulfur-containing polymers for production of a sealant according to claim 2, wherein it contains as the filler magnesium silicate hydrate, aluminum silicate, aluminum hydroxide and/or calcium silicate.

12. An uncured mixture B according to claim 3, wherein it contains as the filler magnesium silicate hydrate, aluminum silicate, aluminum hydroxide and/or calcium silicate.

13. A sealant according to claim 1, having a Shore A hardness of at least 10, measured 5 to 600 minutes after initiating the high-energy actinic radiation, and a Shore A hardness in the range of 30 to 60, measured 2 weeks after initiating the high-energy actinic radiation.

14. A sealant according to claim 1, having the following properties:
no cracks or other defects in the sealant, which occur during determination of a low temperature flexibility by bending at an angle of 30° at a temperature of 55±2°,
a tensile strength in the range of 0.5 to 2.8 MPa after 168 hours of storage in a fuel at a temperature of 60° C., after 300 hours of storage in a fuel at a temperature of 100° C. and/or after 1000 hours of storage in water at a temperature of 35° C.,
an elongation at break in the range of 100 to 800% after 168 hours of storage in fuel at a temperature of 60° C., after 300 hours of storage in fuel at a temperature of 100° C. and after 1000 hours of storage in water at a temperature of 35° C., and/or
a density in the range of 1.00 to 1.45 g/cm$^3$.

15. A sealant according to claim 1, having the following properties after complete curing:
a tensile strength in the range of 0.5 to 3 MPa,
an elongation at break in the range of 100 to 900% and/or
a peel resistance in the range of 50 to 300 N/25 mm.

16. A sealant as in claim 1 which is in contact with components contained in an aircraft.

17. A sealant as in claim 1 which is in contact with an aircraft, a space vehicle, an automobile, a rail vehicles, a ship, equipment, a machine, a building, furniture and an electronic device.

18. A sealant as in claim 1 which is in contact with a metallic substrate, a coated metallic substrate, a structural element, a sheet metal plate, carbon fiber reinforced plastic, or glass fiber reinforced plastic.

19. A sealant as in claim 1 which joins and/or bonds elements or seals and/or fills hollow spaces and/or interspaces of elements.

* * * * *